United States Patent
Dupay

(10) Patent No.: US 6,592,230 B2
(45) Date of Patent: Jul. 15, 2003

(54) TRUCK REARVIEW MIRROR ASSEMBLY HAVING A DISPLAY FOR DISPLAYING TRAILER COUPLING STATUS INFORMATION

(75) Inventor: Steven C Dupay, Holland, MI (US)

(73) Assignee: Holland Hitch Company, Holland, MI (US)

(*) Notice: Subject to any disclaimer, the term of this patent is extended or adjusted under 35 U.S.C. 154(b) by 0 days.

(21) Appl. No.: 09/836,796

(22) Filed: Apr. 17, 2001

(65) Prior Publication Data
US 2001/0022731 A1 Sep. 20, 2001

Related U.S. Application Data

(63) Continuation-in-part of application No. 09/493,534, filed on Jan. 28, 2000, now Pat. No. 6,285,278, and a continuation-in-part of application No. 08/951,250, filed on Oct. 16, 1997, now Pat. No. 6,252,497.

(51) Int. Cl.[7] .................................................. G02B 5/08
(52) U.S. Cl. ...................... 359/839; 359/838; 359/843
(58) Field of Search ................................ 359/839, 843, 359/630, 838; 340/431

(56) References Cited

U.S. PATENT DOCUMENTS

| 809,698 A | 1/1906 | Kelley ........................ 359/839 |
| 1,528,082 A | 3/1925 | Schlaich ...................... 374/141 |
| 1,849,708 A | 3/1932 | Colbert et al. ............... 434/408 |
| 1,884,759 A | 10/1932 | Hodny ........................ 359/603 |
| 1,908,767 A | 5/1933 | Hodny ........................ 359/603 |
| 2,166,303 A | 7/1939 | Hodny et al. ................. 40/584 |
| 2,561,582 A | 7/1951 | Marbel ....................... 362/494 |
| 2,982,566 A | 5/1961 | Geerds ....................... 280/435 |
| 3,013,815 A | 12/1961 | Geerds ....................... 280/435 |
| 3,535,679 A | 10/1970 | Connors ...................... 340/431 |

(List continued on next page.)

FOREIGN PATENT DOCUMENTS

| DE | 3018905 | 11/1980 |
| DE | 3604185 | 8/1987 |
| DE | 4013672 | 10/1991 |
| DE | 3803931 | 2/1992 |
| DE | 19820139 | 11/1999 |

OTHER PUBLICATIONS

Dieter Raab, "Remote Control of Fifth Wheel Couplings," Truck Technology International, 1990 (4 pages). Page and date not shown.

Truck Tech advertisement, "Convertible–Jaw Fifthwheel Senses Kingpin," Nov. 1991, p. 151. date and page # are not indicated.

*Primary Examiner*—Hung Xuan Dang

(57) ABSTRACT

The truck rearview mirror assembly of the present invention is used on a truck having a coupling status system for sensing trailer coupling status. The rearview mirror assembly includes a mirror housing adapted for mounting to a truck, a mirror disposed within the mirror housing, and a display carried by the housing. The display is coupled to the coupling status system for displaying trailer coupling status information to a driver of the truck.

20 Claims, 12 Drawing Sheets

U.S. PATENT DOCUMENTS

| | | | |
|---|---|---|---|
| 3,640,549 A | 2/1972 | Neff et al. .................... 280/435 |
| 3,697,974 A | 10/1972 | Harris et al. ................. 340/275 |
| 3,734,539 A | 5/1973 | Salmi ......................... 280/477 |
| 3,767,292 A | 10/1973 | Rutkowski ................... 359/871 |
| 3,868,127 A | 2/1975 | Marulic et al. ............. 280/434 |
| 3,924,257 A | 12/1975 | Roberts ....................... 340/282 |
| 4,109,235 A | 8/1978 | Bouthors ..................... 340/52 |
| 4,258,421 A | 3/1981 | Juhasz et al. ............... 364/424 |
| 4,274,078 A | 6/1981 | Isobe et al. ................... 340/98 |
| 4,428,595 A | 1/1984 | Martin et al. ............... 280/435 |
| 4,475,100 A | 10/1984 | Duh ........................... 340/98 |
| 4,499,451 A | 2/1985 | Suzuki et al. ................. 340/98 |
| 4,588,267 A | 5/1986 | Pastore ....................... 359/636 |
| 4,614,355 A | 9/1986 | Koch ..................... 280/438 R |
| 4,630,904 A | 12/1986 | Pastore ....................... 359/636 |
| 4,645,970 A | 2/1987 | Murphy ....................... 313/509 |
| 4,649,369 A | 3/1987 | Walker et al. ............ 340/52 R |
| 4,669,748 A | 6/1987 | LeVee ......................... 280/423 |
| 4,685,695 A | 8/1987 | LeVee ......................... 280/423 |
| 4,809,177 A | 2/1989 | Windle et al. ......... 364/424.01 |
| 4,852,901 A | 8/1989 | Beasley et al. ............. 280/477 |
| 4,882,565 A | 11/1989 | Gallmeyer ................. 340/461 |
| 4,988,116 A | 1/1991 | Evertsen ..................... 280/477 |
| 5,014,167 A | 5/1991 | Roberts ..................... 362/83.1 |
| 5,016,996 A | 5/1991 | Ueno .......................... 359/838 |
| 5,108,123 A | 4/1992 | Rubenzik .................... 280/477 |
| 5,191,328 A | 3/1993 | Nelson ................. 340/870.06 |
| 5,207,492 A | 5/1993 | Roberts ....................... 362/30 |
| 5,223,814 A | 6/1993 | Suman ........................ 340/525 |
| 5,224,270 A | 7/1993 | Burrus ......................... 33/264 |
| 5,285,205 A | 2/1994 | White .................... 340/932.2 |
| 5,355,284 A | 10/1994 | Roberts ....................... 362/30 |
| 5,361,190 A | 11/1994 | Roberts et al. ............... 362/61 |
| 5,455,557 A | 10/1995 | Noll et al. .................. 340/431 |
| 5,456,484 A | 10/1995 | Fontaine ..................... 280/434 |
| 5,461,471 A | 10/1995 | Sommerfeld .................. 356/3 |
| 5,477,207 A * | 12/1995 | Frame, Sr. et al. ......... 340/431 |
| 5,481,409 A | 1/1996 | Roberts ...................... 359/639 |
| 5,506,773 A | 4/1996 | Takaba et al. ......... 364/424.03 |
| 5,513,870 A | 5/1996 | Hickman .................... 280/477 |
| 5,530,240 A * | 6/1996 | Larson et al. ............... 250/206 |
| 5,530,421 A | 6/1996 | Marshall et al. ............ 340/436 |
| 5,549,166 A | 8/1996 | Orbach et al. .................. 172/4 |
| 5,583,770 A | 12/1996 | Sekido et al. ......... 364/424.045 |
| 5,617,072 A | 4/1997 | McNeal ...................... 340/431 |
| 5,634,709 A * | 6/1997 | Iwama ...................... 362/83.1 |
| 5,650,784 A | 7/1997 | Hikosaka et al. ........... 341/139 |
| 5,696,676 A | 12/1997 | Takaba ................ 364/424.036 |
| 5,719,713 A * | 2/1998 | Brown ........................ 359/843 |
| 5,729,194 A | 3/1998 | Spears et al. ............... 340/431 |
| 5,757,645 A | 5/1998 | Schneider et al. .... 364/424.034 |
| 5,788,357 A | 8/1998 | Muth et al. ................. 362/38.1 |
| 5,861,802 A | 1/1999 | Hungerink et al. ......... 340/431 |
| 5,917,408 A | 6/1999 | Cardillo et al. ............. 340/439 |
| 5,964,813 A | 10/1999 | Ishii et al. ..................... 710/35 |
| 6,005,724 A | 12/1999 | Todd .......................... 359/884 |
| 6,045,243 A | 4/2000 | Muth et al. .................. 362/494 |
| 6,076,948 A | 6/2000 | Bukosky et al. ............. 362/494 |
| 6,079,837 A * | 6/2000 | Singleton ................... 359/872 |
| D428,842 S | 8/2000 | Todd et al. ................. D12/188 |
| 6,100,794 A | 8/2000 | Hillier ........................ 340/431 |
| 6,106,121 A * | 8/2000 | Buckley et al. ................ 349/11 |
| 6,217,177 B1 * | 4/2001 | Rost ........................... 359/843 |
| 6,222,457 B1 * | 4/2001 | Mills et al. .............. 340/686.1 |
| 6,250,650 B1 * | 6/2001 | Dougls ..................... 280/6.155 |
| 6,252,497 B1 * | 6/2001 | Dupay et al. ................ 340/431 |
| 6,262,831 B1 * | 7/2001 | Bauer et al. ................. 359/265 |
| 6,285,278 B1 * | 9/2001 | Schutt et al. ................ 340/431 |

\* cited by examiner

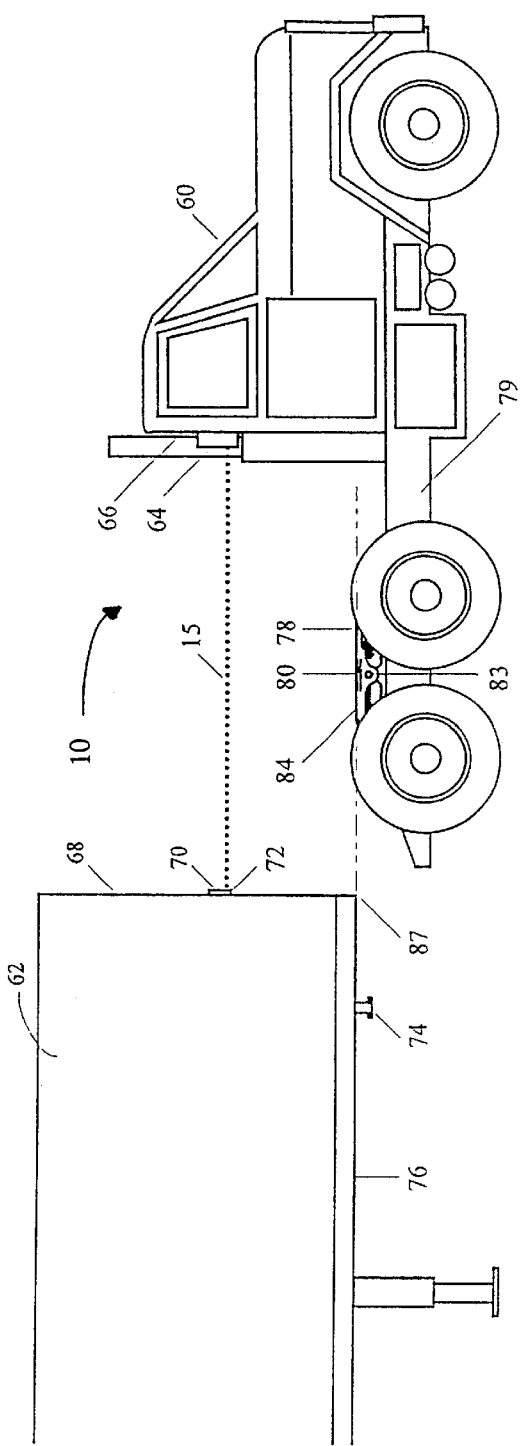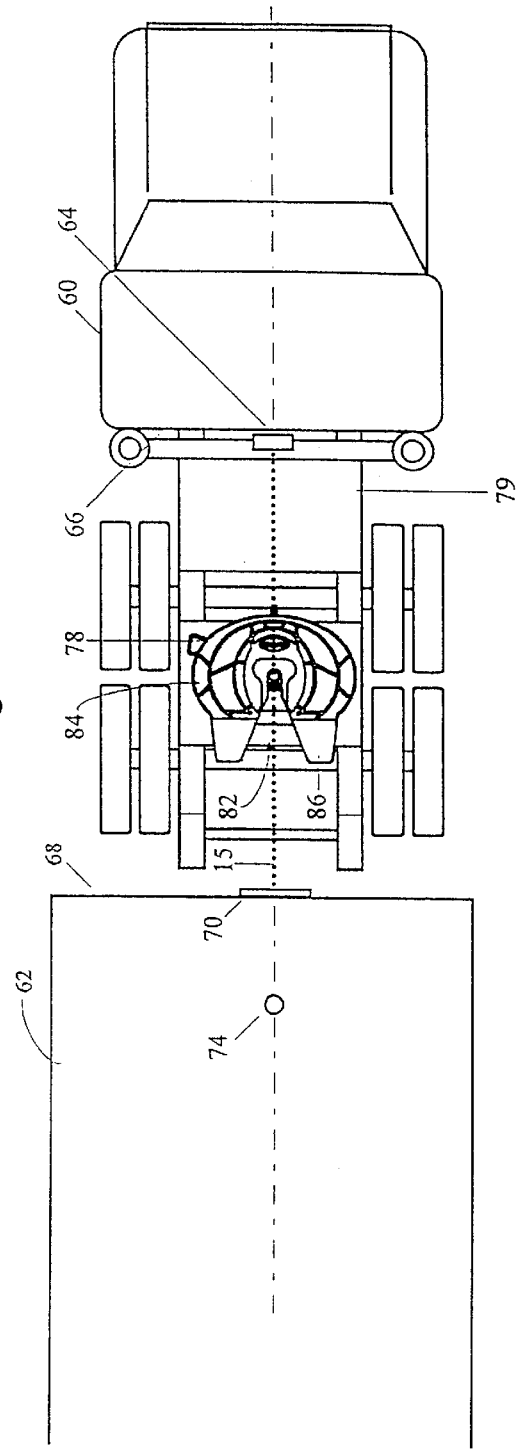

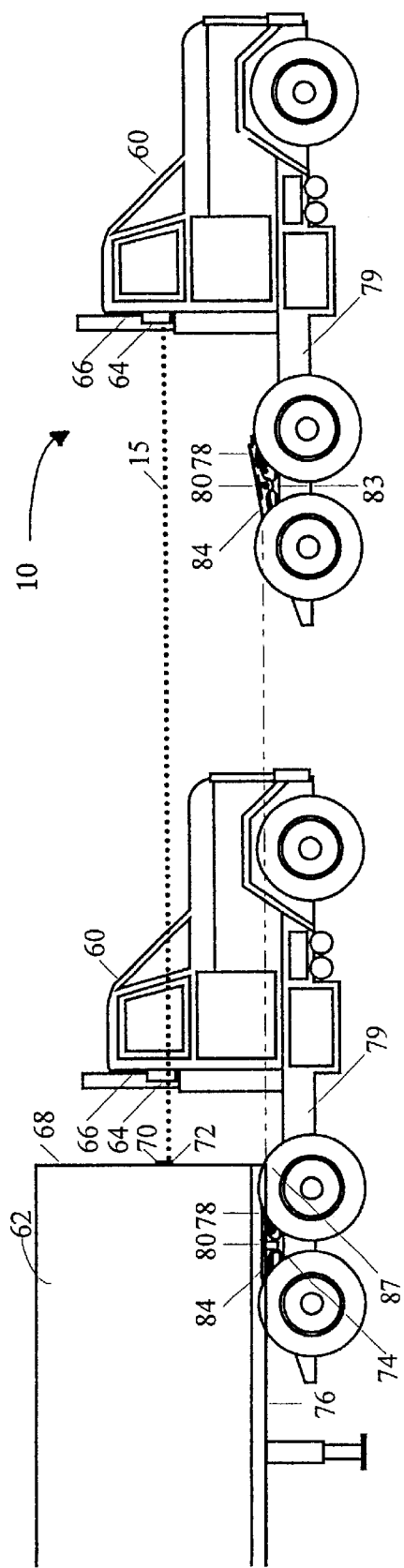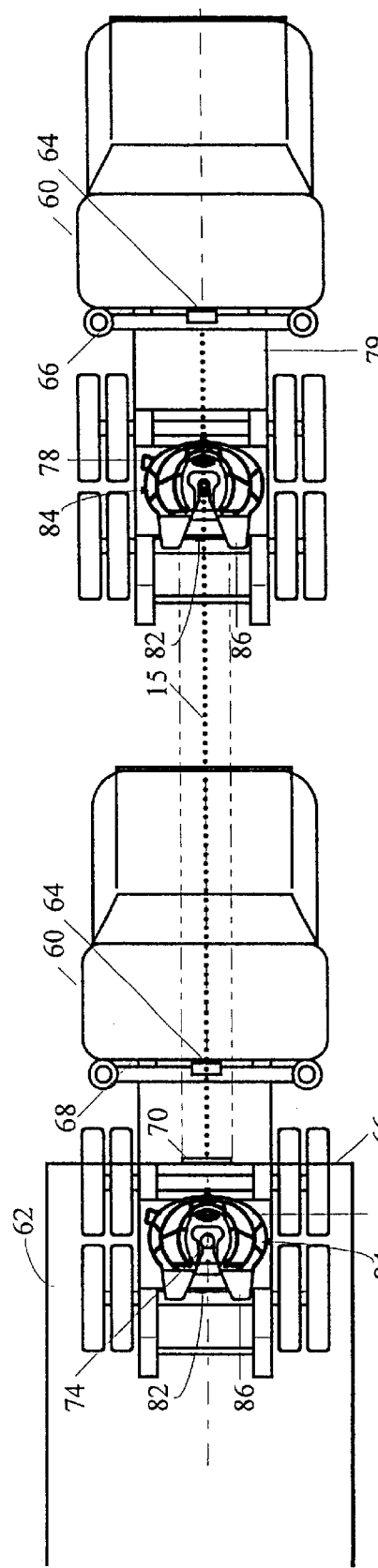

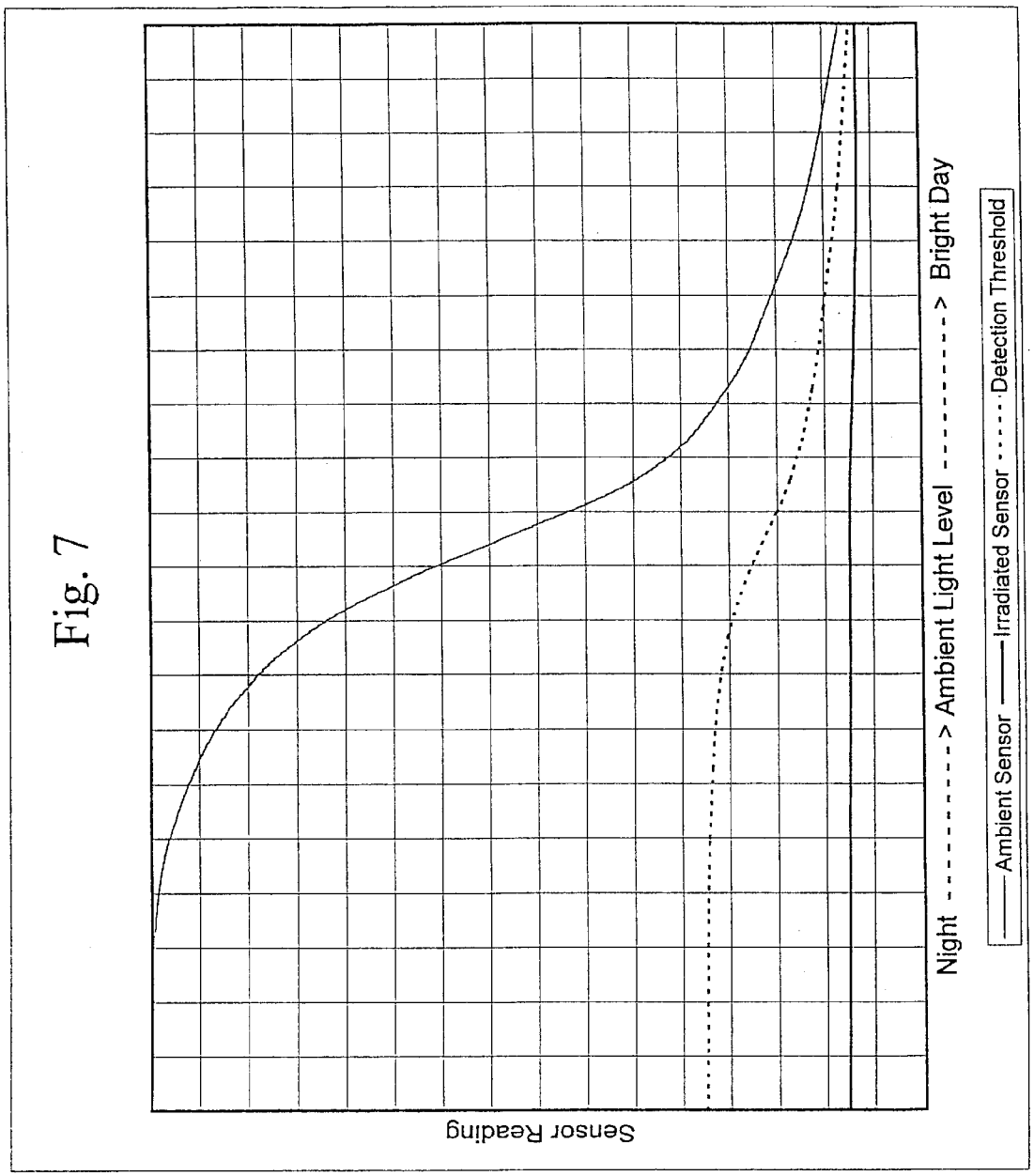

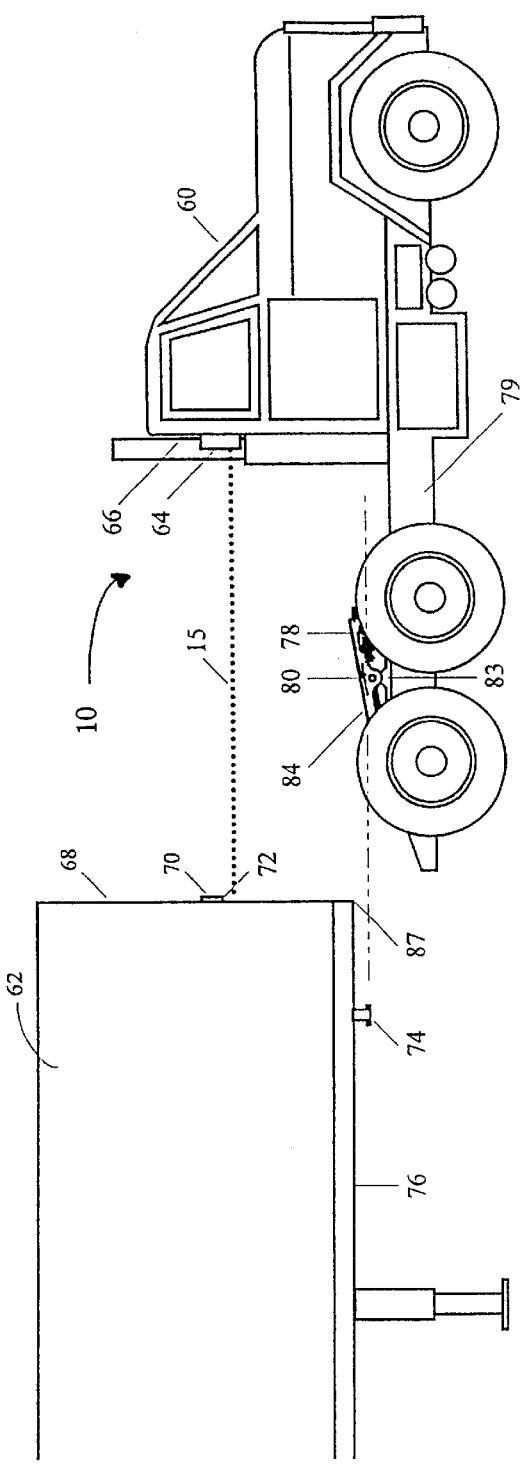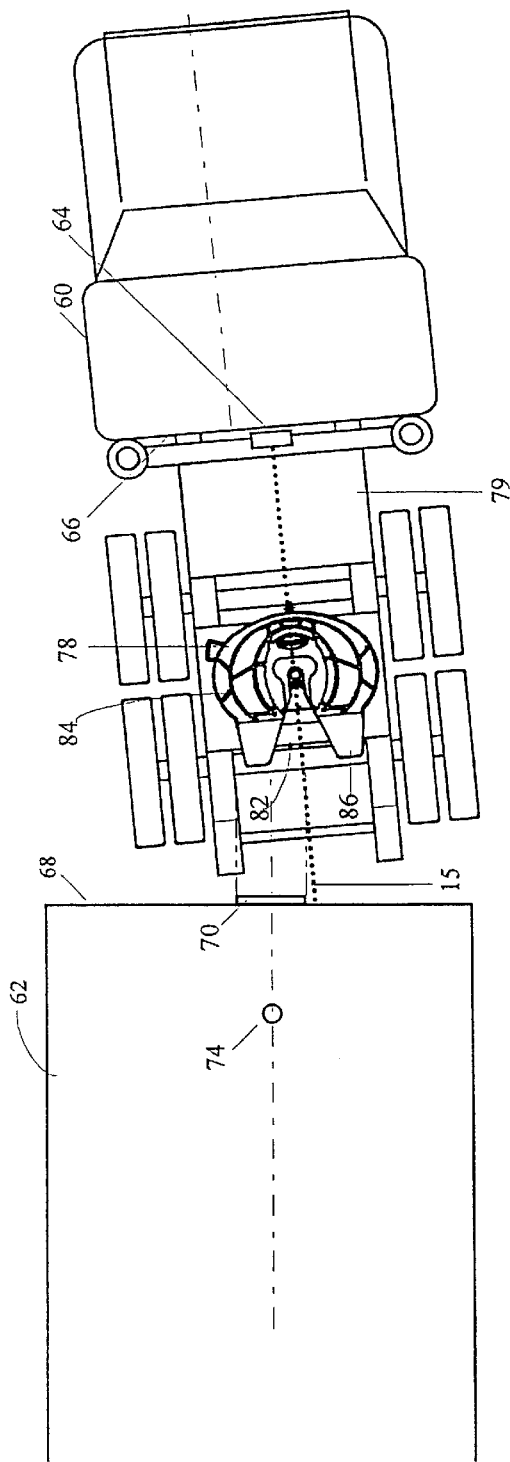

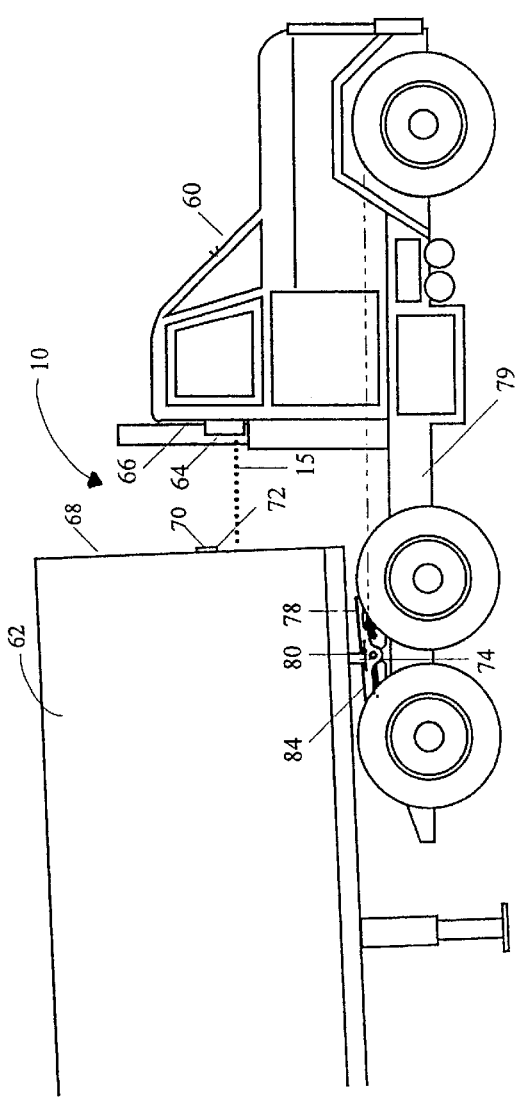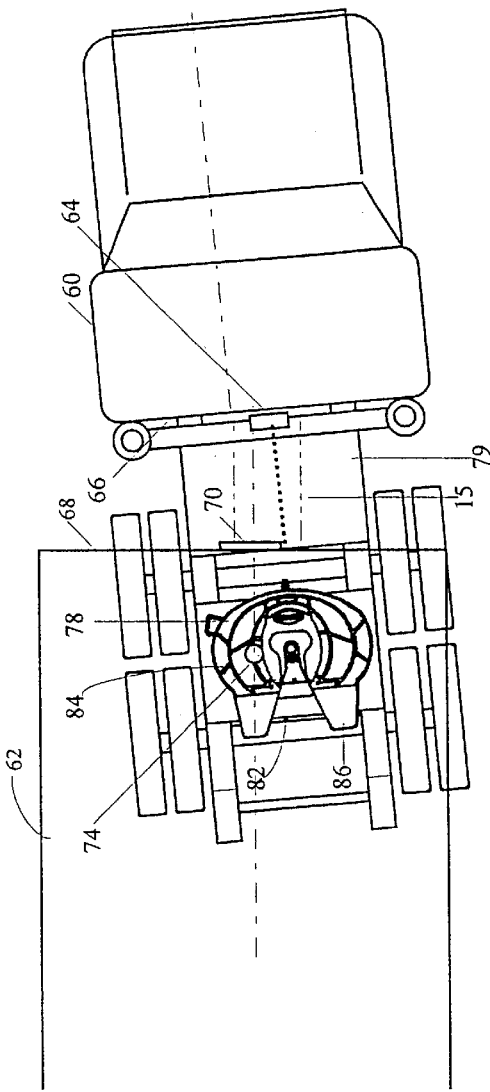

TRUCK REARVIEW MIRROR ASSEMBLY HAVING A DISPLAY FOR DISPLAYING TRAILER COUPLING STATUS INFORMATION

CROSS-REFERENCE TO RELATED APPLICATIONS

This application is a continuation-in-part of U.S. patent application Ser. No. 08/951,250, entitled "COUPLING ALIGNMENT WARNING SYSTEM," filed on Oct. 16, 1997, by Steven C. Dupay et al., now U.S. Pat. No. 6,252, 497. This application is also a continuation-in-part of U.S. patent application Ser. No. 09/493,534, entitled "ELECTRONIC SYSTEM FOR MONITORING A FIFTH WHEEL HITCH," filed on Jan. 28, 2000, by Randy L. Schutt et al., now U.S. Pat. No. 6,285,278. The entire disclosures of both these patents are incorporated herein by reference.

BACKGROUND OF THE INVENTION

The present invention generally relates to rearview mirror assemblies for trucks, particularly heavy trucks, as well as coupling alignment warning systems and electronic hitch coupling status-sensing systems.

To couple a vehicle, such as a commercial truck, to a trailer, the driver must continually estimate the position of the vehicle relative to the trailer while maneuvering the vehicle into alignment with the trailer. In practice, this may involve exiting the truck to determine the position of the truck relative to the trailer and then re-entering the truck to maneuver it into alignment. In addition, the driver utilizes his or her rearview side mirrors to approximate the lateral alignment between the truck and trailer, while vertical alignment is often judged only by "feel," or guess. Such practice often leads to high or low coupling and, possibly, lateral misalignment between the truck and the trailer, which can result in damage to the truck, trailer and/or the interlocking apparatus.

The interlocking apparatus is comprised of components on both the truck and the trailer that mate to achieve a mechanical connection. Typically, the truck is equipped with a locking assembly, known in the heavy trucking industry as a "fifth wheel hitch," and an apparatus mounted to the trailer, known in the industry as a "king pin." The king pin extends downwardly, perpendicular to the bolster plate to which it is attached, the bolster plate being mounted to the bottom surface of the trailer. The fifth wheel hitch includes a hitch plate having a throat with its open end facing rearwardly to receive the king pin, and a locking mechanism for locking the king pin in the throat of the hitch plate.

When backing up the towing unit, the driver often experiences difficulty in aligning the throat of the hitch plate with the king pin. For instance, the height of the king pin relative to the throat may be such that proper mating between the two will not be achieved, even though the two may be laterally aligned. In these instances, the front lower edge of the trailer may crash into the fifth wheel hitch plate (trailer and king pin too low) or the cab of the truck may crash into the body of the trailer (trailer and king pin too high). Alternatively, even though the king pin and fifth wheel hitch may appear coupled, if the king pin is not seated properly in the locking mechanism, a "high couple" may result leading to an unsafe and potentially dangerous condition. On the other hand, even if the two components are at the proper engaging height relative to one another, the throat and the king pin may be laterally misaligned. In either case, positive coupling is not achieved, and the interlocking apparatus and/or the truck/trailer may be damaged or unsafe. Further, the problems attendant with this "guesswork" are exacerbated by the fact that the driver will often be faced with zero or low visibility conditions (night, severe weather, sleeper cab configurations, etc.).

As a result, systems have been developed to provide an output signal to the driver indicating the position of the truck relative to the trailer. Notably, known systems are targeted toward the "ball and hitch" coupling market and are not easily adaptable to the heavy trucking industry.

Known alignment systems use a variety of technologies to measure lateral offset and vertical alignment. Primarily, these systems utilize infrared sensor technology with a modulated pulsed beam. As such, these systems are limited in range (typically less than 20 feet) and require separate sets of infrared sensors on the towing and towed units, respectively, to indicate the lateral offset and vertical alignment. Also, because the infrared emitters and sensors are required on both the towing and towed units, the system must include a remote, powered transmitter on the towed unit. Clearly, these systems are limited in their application, inconvenient, and relatively expensive.

In sum, current commercial truck/trailer coupling is performed relatively "blind" because direct observation of the king pin relative to the fifth wheel lock often is not possible. Further, systems such as air-bag suspensions lead to variable trailer and truck height, making positive coupling even more difficult. As a result, the operator relies on external reference points (trailer corner, tires, etc.) to achieve positive coupling. However, such practice often, as described above, leads to missed or incomplete "hard coupling." These problems, and the damage often associated therewith, are worsened when the driver is faced with low visibility conditions due to cab design, darkness, weather, etc.

Therefore, the commercial trucking industry is in need of a coupling alignment warning system that is contained in a single, relatively inexpensive unit and which is operational during varying environmental conditions. Such a system would minimize the problems associated with high or low coupling and lateral misalignment that leads to non-positive coupling and, would reduce the damage to the trailer, the truck, the fifth wheel hitch, etc.

Conventionally, fifth wheel hitch type trailer hitches provided no form of feedback to the operator in a driving position that indicates whether the king pin of the trailer was securely positioned within the throat of the hitch plate. Thus, it was necessary for the operators to get out of the cab and visually inspect the hitch to determine whether the king pin was properly positioned in the throat and that the locking mechanism that locks the king pin in place is in a locked and secured position. In an attempt to solve this problem, a proximity sensor was provided to determine when the locking mechanism is in a locked position and a visual indicator was provided in the cab to let the operator know when the trailer was securely coupled to the hitch without requiring the operator to leave the cab. An example of such a system is disclosed in U.S. Pat. No. 5,477,207 issued to Frame, Sr. et al. Despite the additional information that such a system provides to the vehicle operator, the information cannot be relied upon if the electrical system is damaged by a broken or short circuit. Additionally, this system does not provide an operator with other useful information that exists prior to the movement of a locking mechanism into a locked position, such as the proximity of the trailer to the hitch assembly. Further, such a system does not require proper coupling and locking before the truck is driven forward and subsequently driven at high speeds on public roadways.

To overcome these problems, an electronically controlled coupling system was developed by the present assignee and is disclosed in U.S. Pat. No. 5,861,802 issued to Hungerink et al. That patent, however, does not incorporate the features of a coupling alignment warning system, nor does this patent disclose placing the display for the electrically controlled coupling system in a rearview mirror system for the truck in which it is implemented.

SUMMARY OF THE INVENTION

According to one embodiment, the truck rearview mirror assembly of the present invention is used on a truck having a coupling status system for sensing trailer coupling status. The rearview mirror assembly includes a mirror housing adapted for mounting to a truck, a mirror disposed within the mirror housing, and a display carried by the housing. The display is coupled to the coupling status system for displaying trailer coupling status information to a driver of the truck.

According to another embodiment, a fifth wheel hitch coupling status sensing system is provided for a truck equipped a fifth wheel hitch and at least one sensor for sensing whether a trailer kingpin is properly locked into the fifth wheel hitch. The system comprises a rearview mirror assembly including a mirror housing, a mirror mounted in the mirror housing, and a support structure adapted for attachment to the exterior of the truck; a display carried on the mirror housing; and a control circuit disposed in the mirror housing and coupled to the display for receiving signals from the at least one sensor and for controlling the display in response to the signals from the sensor to display coupling status information to a driver of the truck.

According to yet another embodiment, an alignment warning system is provided for coupling a towed unit to a towing unit. The system comprises a light source for emitting a beam of light, the light source being attached to the towing unit; at least one sensor attached to the towing unit for receiving light and for generating a detection signal; a control circuit that receives the detection signal and generates an indicator signal in response to the detection signal; and a display mounted in a rearview mirror assembly and responsive to the indicator signal for displaying whether the towing unit is aligned with the towed unit.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 3 is a simplified side view of a towing unit and towed unit having a coupling alignment warning system embodying the present invention showing initial alignment of the primary system components;

FIG. 4 is a simplified top view of a towing unit and towed unit having a coupling alignment warning system embodying the present invention showing initial alignment of the primary system components;

FIG. 5 is a simplified side view of a towing unit and towed unit having a coupling alignment warning system showing the vertical tolerance of the system;

FIG. 6 is a simplified top view of a towing unit and towed unit having a coupling alignment warning system showing the lateral tolerance of the system;

FIG. 7 is a graph of the desired relationship of the detected ambient light level and the threshold level established by the control circuit;

FIG. 8 is a simplified side view of the instant invention showing vertical misalignment between the towing unit and the towed unit;

FIG. 9 is a simplified top view of the instant invention showing lateral misalignment between the towing unit and the towed unit;

FIG. 10 is a simplified top view similar to FIG. 8 showing vertical misalignment between the towing unit and the towed unit;

FIG. 11 is a simplified top view similar to FIG. 9 showing lateral misalignment between the towing unit and the towed unit;

DETAILED DESCRIPTION OF PREFERRED EMBODIMENTS

Figure 1:
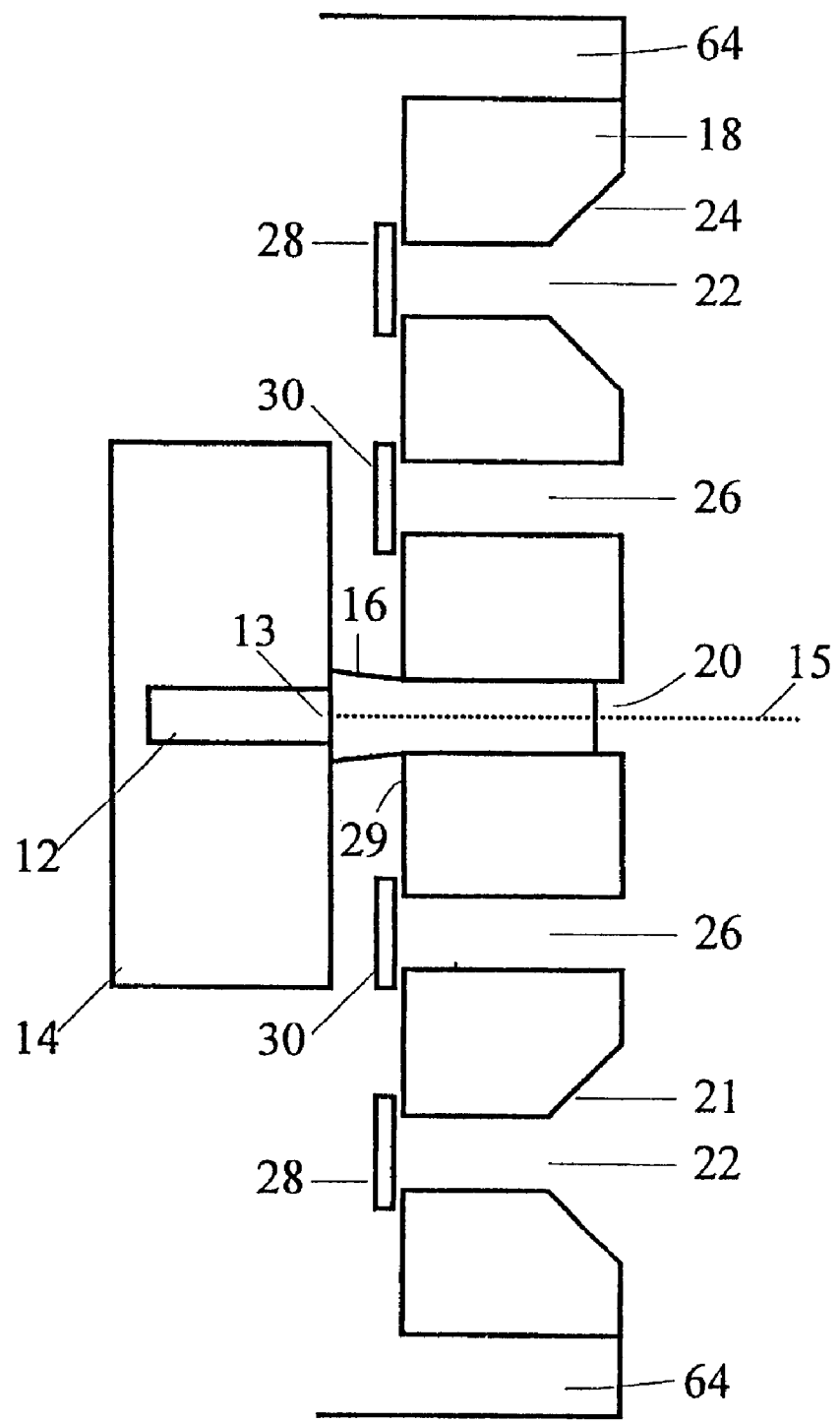
FIG. 1 is an enlarged top view of the transmitter/receiver components of a coupling alignment warning system embodying the present invention.

Referring in more detail to the drawings, FIG. 1 shows the transmitter/receiver components of the coupling alignment warning system (CAWS) 10 for aligning a towing unit with a towed unit by detecting ambient and reflected laser light in the system. In particular, the transmitter includes a laser light source 12 (preferably, a laser diode) that is mounted in an adjustable support 14 that is, in turn, attached to the interior of a rugged enclosure 64. In the preferred embodiment, rugged enclosure 64 is mounted to the towing unit during initial installation as described in more detail below (FIG. 3). The receiving components of the system, which are also shown in FIG. 1, include a spatial filter 18 and a series of sensors 28, 30. Spatial filter 18 has a series of optical tunnels 22, 26 that limit the amount of light that may reach both ambient sensors 28 and target sensors 30, that are positioned adjacent thereto, by restricting the angles at which light may impinge upon sensors 28, 30. Optical tunnels 22 (aligned with ambient sensors 28) have flared receiving ends 24 so that more ambient light may impinge upon ambient sensors 28 than on target sensors 30.

Spatial filter 18 also has a tunnel 20 that is aligned with light source 12 so that a collimated light beam 15 emitted from light source 12 is permitted to pass entirely through spatial filter 18. Sensors 28, 30 are mounted in the path of optical tunnels 22, 26, respectively, with target sensors 30 being positioned closest to the axis of the collimated light beam 15 emitted by laser light source 12. In operation, sensors 28, 30 detect the amount of light in the system including ambient light and, as described in more detail below, laser light that is reflected back towards target sensors 30 to determine whether target acquisition has been achieved. If it has, the CAWS provides continuous feedback to the user indicating that proper coupling will occur as long as alignment is maintained. If alignment is not maintained, the system will not detect reflected laser light and, therefore, will not provide the user with continuous positive coupling feedback, thus indicating to the user that either further maneuvering is necessary to couple the towing unit to the trailer, or that the user should inspect the system for a height adjustment.

To achieve target acquisition, laser light source 12 emits collimated light beam 15 that initially passes through a gun-barrel type tunnel 16 between an output end 13 of light source 12 and interior wall 29 of spatial filter 18. Tunnel 16 insures that collimated laser light beam 15 passes entirely into tunnel 20 of spatial filter 18 without reaching surrounding sensors 30, 28. In other words, tunnel 16 minimizes the chance that the system will detect a false signal. As described in more detail below, once target acquisition is achieved, i.e., laser light impinges upon the target, light beam 15 is at least partially reflected back toward spatial filter 18. Because in the preferred embodiment a retro-reflective target (described below) is used, the laser light is reflected directly back toward laser source 12 and, therefore, principally impinges upon target sensors 30 (they being closer to the path of the laser light beam). The signals are thereafter processed (described below) and, if a sufficient amount of reflected laser light is detected, the CAWS will indicate that the towed and towing units are aligned for proper coupling. As long as the towing unit remains aligned with the towed unit, the system will indicate that positive coupling will occur without further lateral or height adjustment maneuvering by the user.

In the preferred embodiment, sensors 28, 30 are made from CdSe photo-resistors that have a peak sensitivity in tune with the wavelength of light beam 15 emitted by laser light source 12 (~655 nm). Further, spatial filter 18 is formed from an opaque, non-reflective medium that has a predetermined thickness; typically, the medium is black hard rubber or plastic that is approximately 0.75 inch thick. Therefore, spatial filter 18 minimizes the reflection of light impinging upon spatial filter 18 and minimizes the chance that other bright sources of light will generate false signals and, therefore, maximizes the chance that the system reliably identifies whether target acquisition has been achieved.

Figure 2:
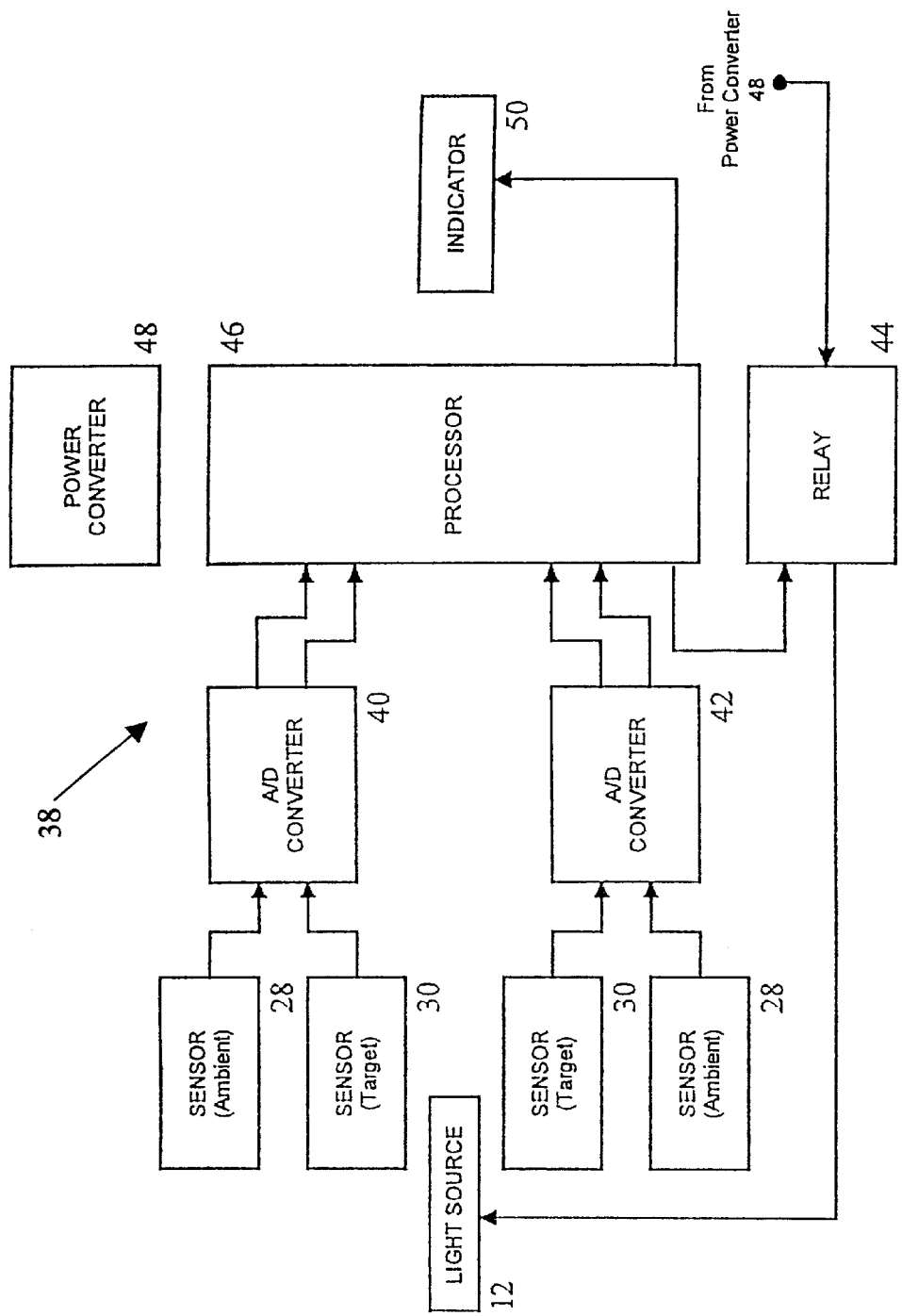
FIG. 2 is an electrical diagram in block form showing the primary signal processing components of the coupling alignment warning system.

Turning to FIG. 2, a block diagram illustrates the operation of the CAWS. Generally, after sensors 28, 30 detect the ambient light in the system, a control circuit 38 calculates a threshold level of light based on the detected level of ambient light. Thereafter, the CAWS determines whether the level of light detected by target sensors 30 reaches that threshold level. If so, control circuit 38 indicates to the user that reflected laser light is being received and that target acquisition has been achieved.

More particularly, when activated, power is supplied to the CAWS, preferably from the battery of the vehicle, through a power converter 48. When laser light source 12 (which is controlled by a microprocessor through a relay, described below) is deactivated, ambient sensors 28 and target sensors 30 detect the amount of ambient light impinging upon sensors 28 and 30. In the preferred embodiment, the system includes two ambient sensors 28 and two target sensors 30, each pair being mounted equidistant from tunnel 20 of spatial filter 18 (FIG. 1). During detection of ambient light, sensors 28, 30 transmit analog output signals, preferably voltage signals, to separate analog-to-digital (A/D) converters 40, 42. The voltage level of the analog output signals varies in response to the sensed level of illumination. Each A/D converter has two inputs for receiving signals from sensors 28, 30. In the preferred embodiment, A/D converters 40, 42 have twelve-bit resolution for converting the analog output signals to discrete values having a high degree of precision.

The discrete values from the A/D converters are then transmitted to a microprocessor 46 (preferably including EPROM technology for program control and data storage) which, in turn, calculates a threshold level of reflected laser light that must be detected before the CAWS will signal that target acquisition has been achieved (described in more detail below). After computing this threshold level, microprocessor 46 activates a relay 44 that allows power to be supplied to laser source 12. Laser source 12, preferably a laser diode, then emits collimated laser light beam (15 in FIG. 1) that is directed toward a target on the towed unit and reflected back toward laser source 12 when properly aligned.

As the driver of the towing unit attempts to achieve positive coupling with the towed unit, sensors 28, 30 detect both ambient light and, upon target acquisition, reflected laser light. As described previously, more ambient light impinges upon ambient sensors 28 due to the corresponding flared ends 24 of optical tunnels 22, as best shown in FIG. 1. Further, more of the reflected laser light impinges upon target sensors 30 than ambient sensors 28 because the retro-reflective target returns light back to its source regardless of the angle of impingement (described below) and, thus, target sensors 30, which are positioned closer to the axis of laser light beam 15, receive more reflected laser light. Nevertheless, target sensors 30 do detect ambient light, so, as the ambient light levels increase, it becomes more difficult to distinguish the reflected laser light from the detected ambient light.

The CAWS 10 of the instant invention solves this problem by continually updating the threshold level of light based upon the most current level of sensed ambient light. When the driver is backing up the towing unit, microprocessor 46 periodically sends a signal to relay 44 which, as a result, deactivates the power supplied to laser source 12 for a predetermined amount of time; preferably, about one half of a second. During this time, the system reads all four sensors 28, 30 simultaneously which, necessarily, are only detecting ambient light. These signals are transmitted to A/D converters 40, 42 and, thereafter, the digitized signals generated by A/D converters 40, 42 are transmitted to and processed by microprocessor 46 to establish a new threshold level. By periodically deactivating laser source 12 and establishing a new threshold level, the system can reliably indicate whether target acquisition has been achieved, even when the ambient light levels vary.

After each time the CAWS establishes a new threshold light level, microprocessor 46 activates laser light source 12, the CAWS reads sensors 28, 30 and determines whether the digitized signals from target sensors 30 reach this threshold level via a set of instructions programmed into microprocessor 46. Microprocessor 46 first processes the digitized target sensor signals and then determines whether the target sensor signal reaches the calculated threshold level and, if so, transmits an indicating signal to an indicator 50 which notifies the user that target acquisition is currently achieved. The indicator 50 could provide, for example, an LED display and/or an audio output of the indicator signal. In one embodiment, the LED display would remain illuminated as long as the CAWS detects reflected laser light. If the towing and towed units become misaligned, the sensors will no longer detect reflected laser light and the processor will deactivate the LED to signal to the driver that the towing and towed units need to be repositioned for positive coupling to occur.

A graphical representation of the relationship between the detected ambient light level and the threshold level calculated by microprocessor 46 is shown in FIG. 7. Because photo-resistor sensors are used, the resistance of sensors 28, 30 is measured and the resistance levels (ambient, target, and threshold) are plotted as a function of the amount of light detected by the system. As will be appreciated by those skilled in the art, the resistance levels of the sensors may be determined by passing a fixed current through the sensors and monitoring their voltage levels. Also, note that when progressively more light impinges upon the sensors, i.e., when the system is used in the daytime as opposed to night, the resistance of each sensor decreases.

As suggested above, the "threshold" curve designates the resistance level that the target sensors must reach before the CAWS indicates to the user that target acquisition has been achieved. At night, when the ambient light consists mainly of artificial light, such as light emitted by headlights, the measured resistance of target sensors 30 (when target sensors are detecting reflected laser light) is significantly lower than the measured resistance of ambient sensors 28 since ambient sensors 28 receive very little light at all in such conditions. However, as the system is exposed to brighter ambient light, e.g., daytime, the measured resistance of ambient sensors 28 decreases dramatically, and approaches the measured resistance of target sensors 30 when target sensors 30 are receiving both reflected laser light and ambient light. As a result, it is much more difficult to determine whether target acquisition has been achieved during the daytime than at night and, therefore, the CAWS continually updates the threshold level to establish the greatest degree of distinguishability for varying ambient conditions.

By continually updating the threshold resistance level based on the amount of ambient light in the system and by incorporating relatively high resolution A/D converters, microprocessor 46, which is programmed with instructions to calculate the threshold level based on the desired relationship shown in FIG. 7, determines whether the measured resistance of target sensors 30 reaches the calculated threshold level of resistance. If it does, microprocessor 46 transmits an indicating signal to indicator (50 in FIG. 2), thus notifying the user that target acquisition is currently achieved. Therefore, the CAWS is reliable regardless of the current amount of ambient light present during operation.

Referring next to FIGS. 3 and 4, a more detailed description of the initial set-up and operation of the CAWS 10 is shown. In FIGS. 3 and 4, initial alignment of the system on level ground is shown with the position determining components mounted on a towing unit 60 and a towed unit 62. The CAWS 10 includes a rugged enclosure 64 that contains the laser light source 12, sensors 28, 30 and the control circuit 38 (not shown in FIGS. 3 and 4), as well as a retro-reflective target 70 that together cooperate to send a signal to the driver that continuously indicates alignment of towing unit 60 relative to towed unit 62 as long as laser light impinges upon target 70.

FIGS. 3 and 4 also show a locking apparatus that is included on the towing and towed units 60, 62. In particular, towed unit 62 has what is commonly known in the commercial trucking industry as a king pin 74 that extends downwardly from a bottom surface 76 of towed unit 62. Further, towing unit 60 has what is known in the trucking industry as a fifth wheel hitch 78. Fifth wheel hitch 78 includes a hitch plate 80 having a throat 82 (FIG. 4) for receiving king pin 74 and which pitches about a mounting bracket 83 approximately at its center. Fifth wheel hitch 78 is mounted to a frame 79 of towing unit 60 (FIG. 4) such that an open end 86 of throat 82 faces rearwardly to receive and lock king pin 74 of towed unit 62 when the two are brought into engagement.

In the preferred embodiment, as shown in FIGS. 3 and 4, rugged enclosure 64 is mounted to a back wall 66 of towing unit 60, above the grease and contaminant area, so that light beam 15 emitted by laser light source 12 is directed generally perpendicular to wall 66 of towing unit 60. Further, rugged enclosure 64 is mounted at a height X defined by a top surface 84 of hitch plate 80 when hitch plate 80 is level and the axis of light beam 15 emitted from laser source 12, laser source 12 being mounted in rugged enclosure 64 as best shown in FIG. 3. Retro-reflective target 70 is mounted to a front vertical surface 68 of towed unit 62 at a height corresponding to the height X at which rugged enclosure 64 is installed. In particular, retro-reflective target 70 is attached to surface 68 at distance X defined by a bottom surface 76 of towed unit 62 (which is at the same height relative to the ground as top surface 84 of hitch plate 80 when coupled) and a bottom surface 72 of retro-reflective target 70, such that laser light beam 15 contacts bottom surface 72 of retro-reflective target 70 when towed unit 62 and towing unit 60 are on level ground, as shown in FIG. 3.

Light beam 15 is initially aligned so it strikes lower edge 72 and center of target 70 to accommodate the tolerance of allowed vertical misalignment (described below). Further, turning to FIG. 4, rugged enclosure 64 is mounted such that laser beam 15 is emitted perpendicularly from, in the preferred embodiment, the center of width of back wall 66 of towing unit 60, corresponding to the center axis of throat 82 of fifth wheel hitch 78. Retro-reflective target 70 is placed at the center of width of surface 68 of towed unit 62, which corresponds to the position of king pin 74, i.e., king pin 74 is likewise centered relative to the width of towed unit 62. Alternatively, the enclosure 64 and target 70 could be offset to accommodate alternate mounting on some trailers. Also, note that retro-reflective target 70 is, in the preferred embodiment, removably attached to towed unit 62 for ready installation and adaptability. For instance, target 70 may have a magnetic backing that makes attaching and aligning the CAWS at initial installation relatively effortless.

Alternately, rather than measuring the height X to initially align the components of the CAWS, towed unit 62 could first be coupled to towing unit 60 and, thereafter, the user could adjust the position of retro-reflective target 70 with respect to rugged enclosure 64 to achieve the alignment shown in FIGS. 3 and 4. The user would activate the CAWS and position enclosure 64 and target 70 so that the axis of light beam 15 is directed at the center of bottom surface 72 of target 70 when towing unit 60 and towed unit 62 are on level ground. This latter approach to initial installation and alignment is particularly useful in the trucking industry because users can simply perform one coupling operation, align rugged enclosure 64 with retro-reflective target 70, and then simply install rugged enclosure 64 and retro-reflective target 70 on the remainder of their fleet of towed and towing units corresponding to the position of these elements at initial alignment.

The specific characteristics of retro-reflective target 70 are preferably exploited during the operation of the CAWS 10. The nature of retro-reflective target 70 is such that, when laser light from laser source 12 impinges upon it, the target returns the laser light directly to source 12 regardless of impingement angle. Target 70 has an array of closely spaced miniature corner cube reflectors, each of which contains three walls that are mutually perpendicular for reflecting light back to its source. Also, to insure that all the light that impinges on the cube reflector returns to the laser light source 12, the surface of each cube reflector is made of a highly reflective material. Therefore, by positioning target sensors 30 close to the axis of laser light source 12 and reading these sensors, the CAWS can reliably determine whether target acquisition is currently achieved. Note that, in the preferred embodiment, retro-reflective target 70 corrects for off-angle coupling approaches within a range of ±45°. Commercially available retro-reflective targets, which offer acceptable performance, include Model BRT-2×2 by Banner Engineering Corp. and Model UZZ112 from Nais Aromat Corp.

Although the locking apparatus will not couple if king pin 74 does not enter throat 82 of fifth wheel hitch 78, an amount of misalignment is allowed between towing unit 60 and towed unit 62 while still achieving positive coupling. The lateral misalignment tolerance is defined by the dimensions of fifth wheel hitch 78 and, more particularly, the dimensions of open end 86 of throat 82 of fifth wheel hitch 78. The vertical misalignment tolerance is defined by the maximum height that the ramps (not shown) on the open end 86 of throat 82 can safely engage the lower front edge 87 of towed unit 62 and "lift" said towed unit to the proper height during the coupling action (FIG. 3). As best shown in FIGS. 5 and 6, in the preferred embodiment, retro-reflective target 70 is rectangular having dimensions that are approximately four inches high by twelve inches wide corresponding to the dimensions of the opening of throat 82 of fifth-wheel hitch 78 and king pin 74. When laser light beam 15 is impinging upon retro-reflective target 70, the CAWS senses target acquisition and, as the driver backs up towing unit 60, bottom surface 76 of towed unit 62 will contact the top surface 84 of hitch plate 80 and king pin 74 will enter throat 82 to couple fifth wheel hitch 78 and king pin 74. If the height of towed unit 62 is lower than that shown in FIG. 5, the CAWS 10 will continue to indicate proper alignment as long as the height of towed unit 62 is not more than four inches below the initial, and ideal, height that is shown in FIG. 5. If towed unit 62 is more than four inches below the height shown in FIG. 5, surface 68 of towed unit 62 may crash into outwardly facing open end 86 of hitch plate 80.

The instant invention accounts for this potential fault condition by utilizing a retro-reflective target that is four inches high. If towed unit 62 and, necessarily, retro-reflective target 70 attached thereto is lower than four inches below what it is in initial alignment, laser light beam 15 will not impinge upon retro-reflective target 70 and no laser light will be reflected back toward rugged enclosure 64. Thus, the CAWS 10 will not detect reflected laser light and will indicate to the user that target acquisition has not been achieved, i.e., that positive coupling will not occur without repositioning the towing and/or towed units. Similarly, if towed unit 62 is at a height (relative to towing unit 60) that is higher than it was at initial alignment, or if towing unit 60, and more specifically, laser light beam 15, is at a lower height than it is at initial alignment, king pin 74 will be too high to engage throat 82 of fifth wheel hitch 78 and positive coupling cannot occur (FIG. 10). In this case, as shown in FIGS. 8 and 10, no laser light will contact retro-reflective target 70 and the system will appropriately indicate that target acquisition has not been achieved.

Further, as best shown in FIG. 6, the CAWS 10 will tolerate a twelve-inch range of lateral misalignment. Because laser source 12 mounted in rugged enclosure 64 is initially aligned so that laser light beam 15 strikes the center of retro-reflective target 70 and because retro-reflective target 70 is twelve inches wide, the system will signal to the user that towing unit 60 will be unable to couple to towed unit 62 if the approach that the driver of towing unit 60 takes is more than six inches, in either lateral direction, off the center line of initial alignment (shown in FIG. 4). As depicted in FIGS. 9 and 11, if the driver's approach is more than six inches off the center line of initial alignment, light beam 15 will not reflect off of retro-reflective target 70 and, therefore, retro-reflective target 70 will not redirect any laser light back toward rugged enclosure 64. Sensors 28, 30 will not detect reflected laser light and the system will properly indicate to the user that target acquisition has not been achieved. Clearly, if the approach then taken is continued, positive coupling will not occur and damage to the components could result. In operation, the CAWS provides this position information continuously so that the user has sufficient time to correct any misalignment between the towed and towing units.

Figure 12:
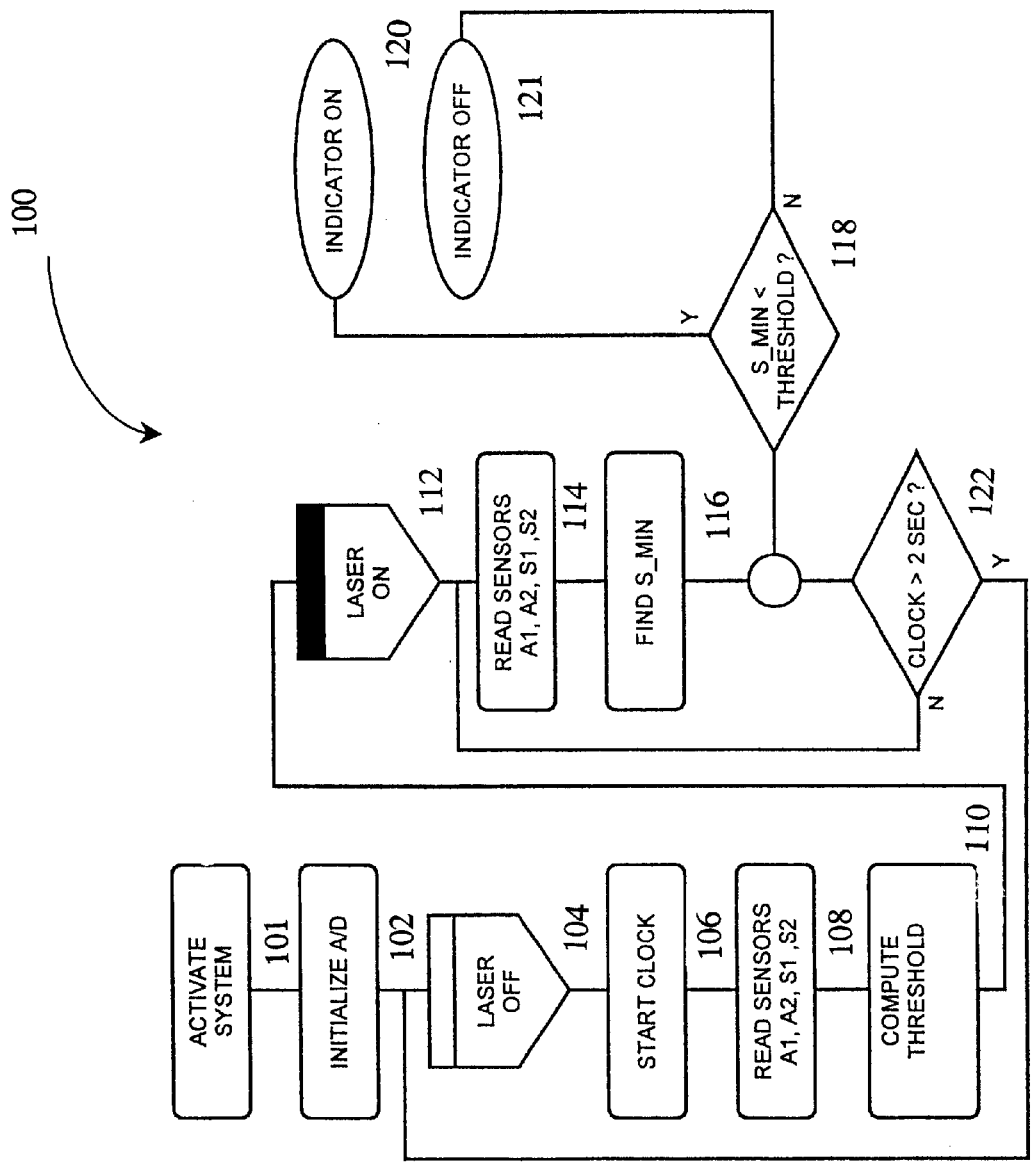
FIG. 12 is a block diagram depicting the operation of the coupling alignment warning system.

The operation of the system is depicted in FIG. 12 which shows that, in the preferred embodiment, when the system 100 is activated (step 101), the analog-to-digital converters are initialized (step 102) while the laser light source is off (step 104). Then, the microprocessor clock signal is started (step 106) and the sensors, ambient and target, are read (step 108), digitized and electrically coupled to the processor for computation of the threshold level (step 110) based on the amount of ambient light in the system (described above). Next, the laser light source is activated (step 112) and the sensors are continuously read (step 114) as the driver attempts to couple the towing unit with the towed unit. The sensor signals are digitized by the analog-to-digital converters, and then coupled to the processor which computes a value, S_MIN (step 116), that is compared with the computed threshold level (step 118). In the preferred embodiment (as described above), if S_MIN is less than the computed threshold level, a positive coupling signal (step 120) is sent to the indicator, and if not, the indicator remains off (step 121). The system repeats this process as the driver of the towing unit attempts to achieve positive coupling. Further, each time S_MIN is established based on the entered readings, the processor asks whether the clock signal is greater than two seconds (step 122), and, if so, computes a new threshold level based on the then current amount of ambient light in the system.

In a further embodiment of the present invention, the laser light source could be mounted on the towing unit so that it is capable of multi-dimension tracking of the position of the towed unit by, for example, mounting laser light source 12 on a gimbal system. In such a system, the laser could maintain target acquisition even when the relative height between the towed and towing units varies, e.g., when backing up on a hill. In addition, the system could be adapted for scanning the retro-reflective target laterally and/or vertically, therefore tracking the position of the towing unit relative to the towed unit in two dimensions. The measured azimuth and elevation angles could be transmitted to the user via the display unit to further assist in maneuvering the towing unit for proper alignment with the towed unit.

Also, in another embodiment, the detected light signals could be processed by a wave band filter tuned to pass only light having a wavelength corresponding to the emitted laser light. If the filter passes a signal, the system necessarily must be detecting reflected laser light and, therefore, will indicate to the user that target acquisition has been achieved. Alternatively, by modulating the laser light beam with bits of data and, thereafter, processing the detected light signals to determine whether the data is present, the system can indicate to the user whether reflected laser light has been sensed and, therefore, whether target acquisition has been achieved.

The CAWS may be manually activated by the user or, alternatively, the system may be activated by certain vehicle operations. For instance, the system could be adapted to sense when the towing unit is in reverse and, in response, activate the CAWS. To deactivate the CAWS, the system could be used in conjunction with the fifth wheel hitch coupling control systems disclosed in U.S. patent application Ser. No. 09/493,534 or U.S. Pat. No. 5,861,802, which both include an optional tilt sensor for sensing when the fifth wheel hitch plate is tilted from its resting position indicating that the trailer is now proximate the fifth wheel, a king pin sensor for sensing when the king pin has entered the throat of the fifth wheel hitch, and a lock sensor for detecting when a locking mechanism of a trailer hitch assembly is locked. The disclosures of U.S. patent application Ser. No. 09/493,534 and U.S. Pat. No. 5,861,802 are incorporated herein by reference. By interfacing the CAWS with the invention of the '534 application, activation/deactivation of the CAWS may be automatically controlled; for example, when the lock sensor detects that the fifth wheel hitch is locked to the king pin, the lock sensor signal could be utilized to deactivate the CAWS. With respect to activation of the CAWS, as noted above, the CAWS may be automatically activated when the truck is placed in reverse, and when interfaced with the coupling control systems discussed above, activation may be prohibited when the coupling control system has detected that the trailer has already fully hitched and locked to the fifth wheel hitch.

Figure 13A:
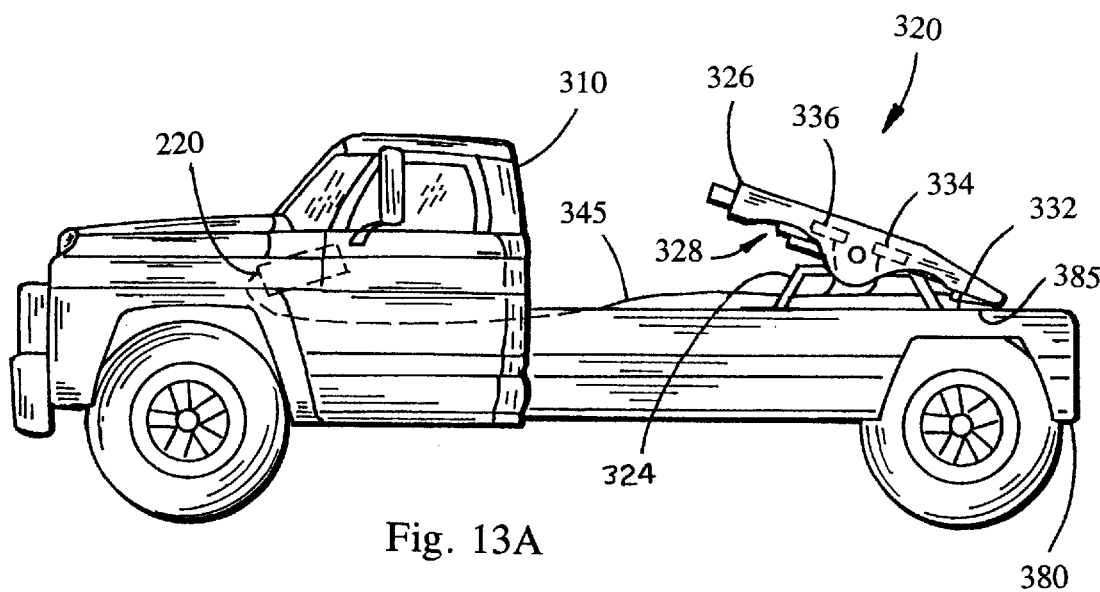
FIG. 13A is a side elevational view of a truck including an electronic system for monitoring a trailer hitch assembly according to one embodiment of the present invention.

A coupling control system similar to that disclosed in U.S. patent application Ser. No. 09/493,534 is shown in FIGS. 13A–13D and 14, and is described below. FIG. 13A shows a truck tractor 310 which includes a trailer hitch assembly 320 having a base 324 securely mounted to a chassis 380, a trailer hitch plate 326 pivotally mounted on base 324 on a transverse axis and a locking mechanism 328 for locking a conventional trailer kingpin in place. The electronic system of the present invention preferably includes three proximity sensors mounted to hitch assembly 320 and an output device 350 mounted in the cab of tractor 310. These sensors are coupled to output device 350 by a multi-conductor cable 345. In a preferred embodiment, the three sensors mounted to trailer hitch assembly 320 include a tilt sensor 332, a kingpin sensor 334 and a lock sensor 336. Depending upon the application, tilt sensor 332 may not be implemented.

Figure 13B:
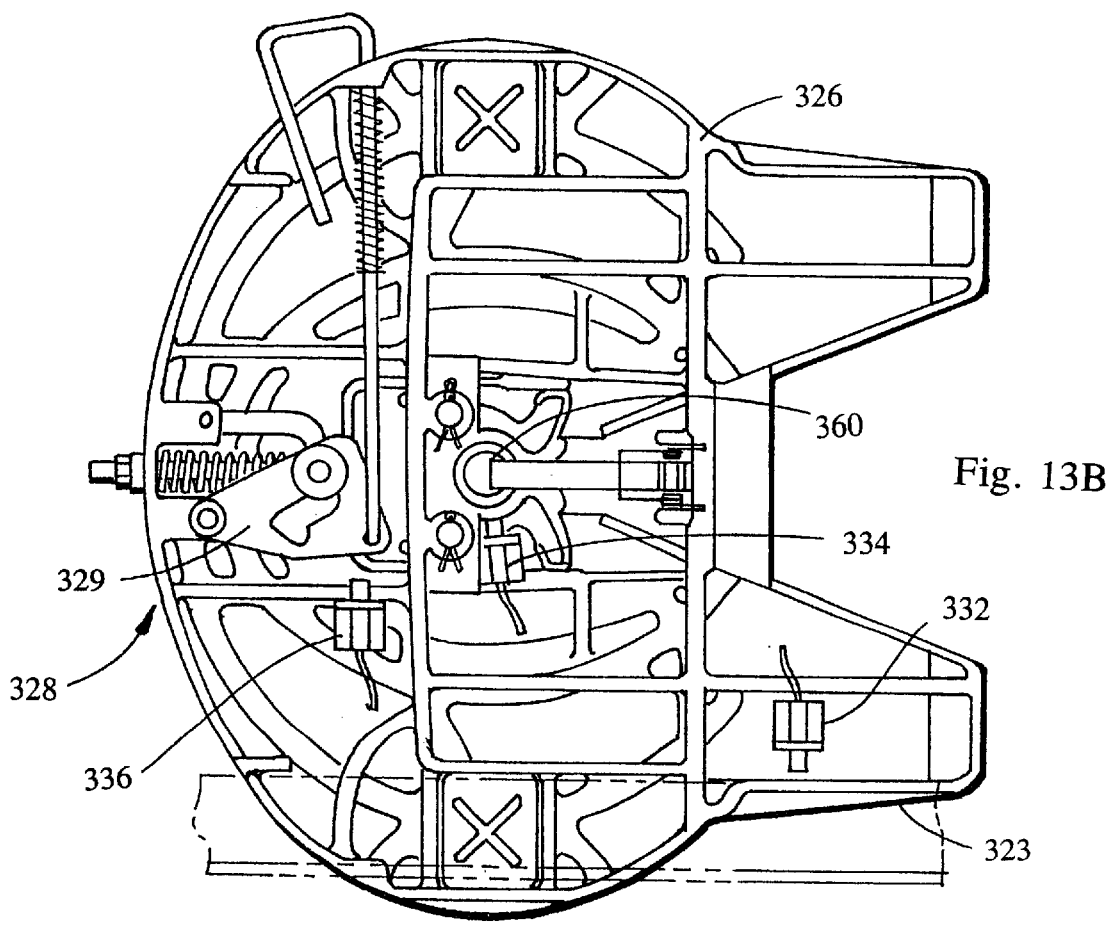
FIG. 13B is a bottom plan view of the trailer hitch assembly shown in FIG. 13A.
Figure 13C:
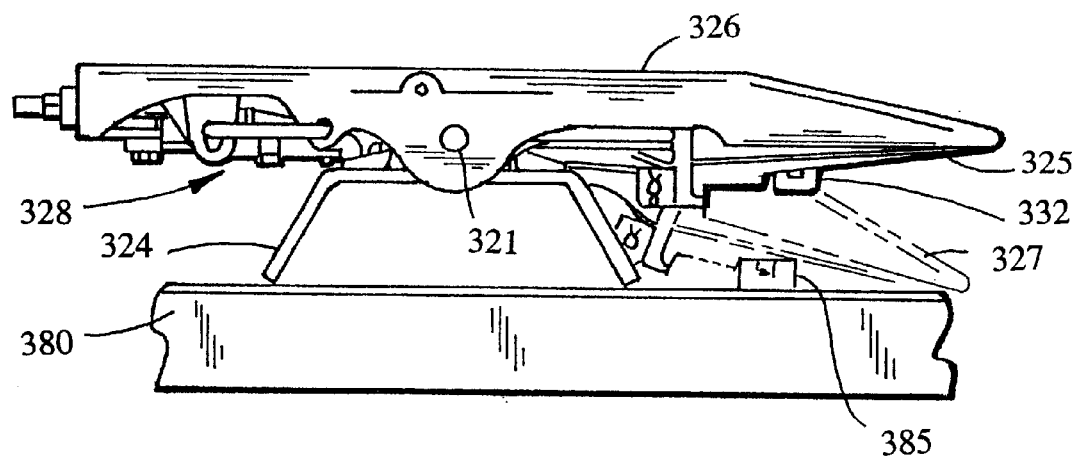
FIG. 13C is a side elevational view of the trailer hitch assembly shown in FIG. 13A.
Figure 13D:
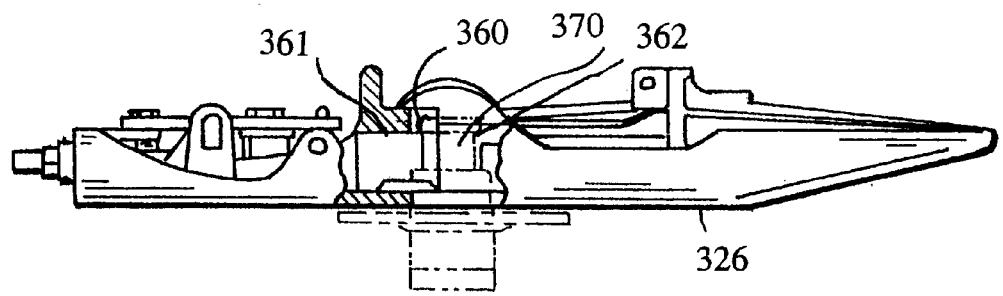
FIG. 13D is a side elevational view in partial cross section of the trailer hitch assembly shown in FIG. 13B.

FIGS. 13B–13D provide a more detailed view of trailer hitch assembly 320 of FIG. 13A. In a preferred embodiment, tilt sensor 332 is mounted on a flange 323 of hitch plate 326 such that the sensing end faces outward in a direction perpendicular to the pivot pins 321. FIG. 13C shows the hitch plate 326 from the side in combination with base 324 in a coupled horizontal position 325 and in an uncoupled at rest position 327 (dashed lines). By mounting a metal plate 385 on chassis 380 in a position near where the sensing end of tilt sensor 332 is positioned when trailer hitch plate 326 is in the resting position, tilt sensor 332 detects the presence of plate 385 as a basis for determining that the hitch plate is tilted or at a rest position. When tractor 310 is backed under a trailer, contact is made between a tilted hitch plate 326 and a portion of the trailer. This contact causes hitch plate 326 to rotate into a coupled (horizontal) position. When tilt sensor 332 subsequently detects the absence of plate 385, it can be concluded that hitch plate 326 has been moved from its rest position and the trailer is in proximity to the hitch assembly. Alternatively, sensor 332 may be mounted so as to detect metal when hitch plate 326 is in the horizontal coupled position.

FIG. 13B shows kingpin sensor 334 mounted to hitch plate 326 with the sensing end near the throat 60 formed in hitch plate 326, into which a trailer kingpin 370 is positioned and locked. FIG. 13D provides an upside-down side view and partial cross-section illustrating the location of trailer kingpin 370 when properly disposed in throat 360. As constructed, kingpin sensor 334 outputs a detection signal when the metal trailer kingpin's lower flange is disposed in throat 360, below a lock plane 361. That is, kingpin sensor 334 is in a plane below locking mechanism 328 and only detects kingpin 370 when a kingpin rib 362 of kingpin 370 extends below lock plane 361. The location of kingpin sensor 334 prevents it from indicating that kingpin 370 is present when a high coupling occurs, which prevents locking mechanism 328 from securing kingpin 370 (i.e., the trailer) to hitch plate assembly 320. Locking mechanism 328, of hitch plate assembly 320, is biased by a compression spring to automatically lock-in and secure the trailer kingpin 370, as soon as it enters the hitch throat 360. FIG. 13B shows lock sensor 336 mounted to hitch plate 326 such that a sensing end is in a position proximate to a position of that of a metal cam plate 329 (of locking mechanism 328) when in a locked position. In this manner, lock sensor 336 detects the presence of cam plate 329 as a basis for detecting if the locking mechanism is in a locked and secured position. Those of ordinary skill in the art will appreciate that the present invention may be used in connection with any type of a locking mechanism. It should also be noted that the present invention may be applied to trailer hitch assemblies having other constructions and is not limited to particular mounting locations shown for sensors 332, 334 and 336.

Figure 14:
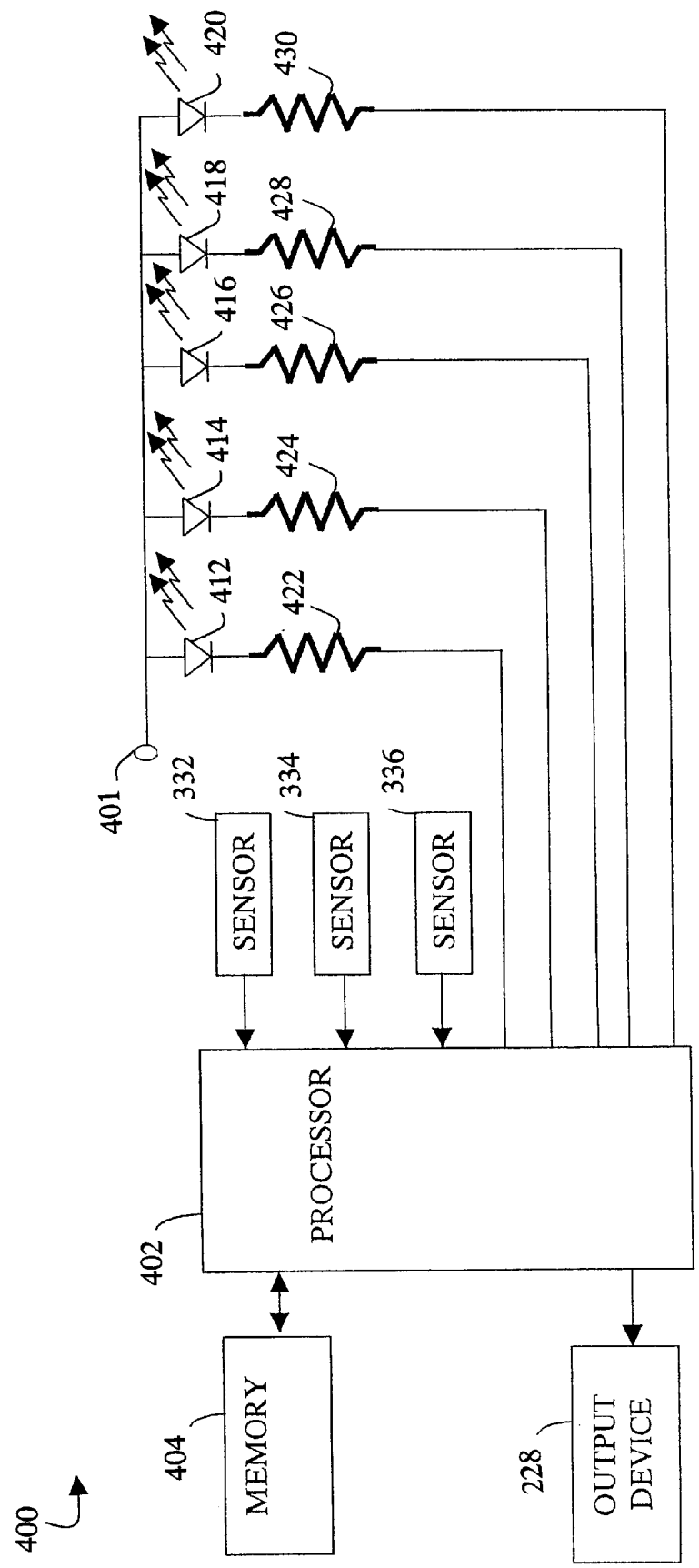
FIG. 14 is a block diagram of an electronic system for monitoring the trailer hitch assembly shown in FIG. 13A according to one embodiment of the present invention.

FIG. 14 depicts a block diagram of an electronic system 400, according to an embodiment of the present invention. Electronic system 400 includes a processor 402 that receives input from sensors 332, 334 and 336. Processor 402 is also coupled to a memory 404 and an output device such as an alpha-numeric display 228 of a display 220, as described below. In a preferred embodiment, processor 402 is a PIC16C62, manufactured by Microchip Technology Inc. of Chandler, Ariz. A plurality of outputs of processor 402 are coupled through current limiting resistors 422, 424, 426, 428 and 430 to LEDs 412, 414, 416, 418 and 420, respectively. Processor 402 runs a routine that, depending upon the input from sensors 332, 334 and 336, may cause an error code to appear on alpha-numeric display 228 and may cause different ones or combinations of LEDs 412–420 to be illuminated thereby illuminating one or more of display icons 222–226 and indicator light 230 of display 220, as described below. In normal operation, a positive voltage is applied at terminal 401 that enables LEDs 412–420 to emit light, as dictated by processor 402.

The coupling control systems discussed above further include a display for displaying coupling status information to the driver. Such a display allows the driver to monitor the status of the hitch coupling to confirm that the hitch locking mechanism is properly locked about the king pin without requiring the driver to leave his or her cab and manually inspect the hitch. The system may also provide a visible and/or audible warning when it is determined that the hitch is not properly locked about the king pin. It is contemplated that both the displays for the coupling control systems discussed above and the CAWS may be integrated into a single display. According to the present invention, a preferred implementation of the display is to position the display on or within the truck's driver side rearview mirror assembly. The rearview mirror assembly is a preferred location for this display since the truck driver is typically utilizing this mirror while backing up to a trailer and while coupling to the trailer. Thus, a driver would not need to divert his or her eyes from the mirror to view the display. A preferred implementation of the display in a rearview mirror assembly is described below with reference to FIGS. 15 and 16.

Figure 15:
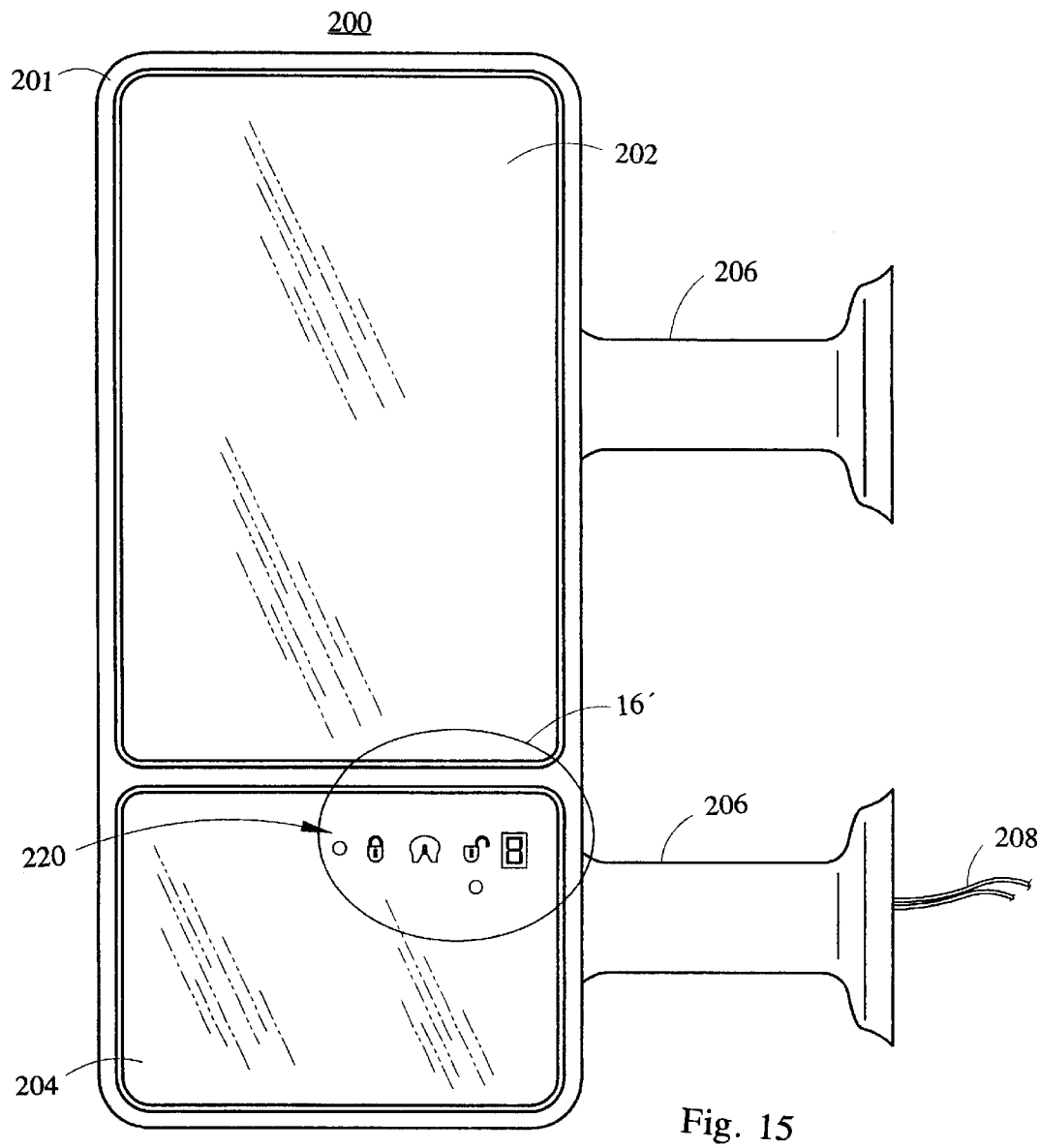
FIG. 15 is a perspective view of a truck rearview mirror assembly constructed in accordance with a preferred embodiment of the present invention.

As shown in FIG. 15, a truck rearview mirror assembly 200, according to the present invention, may include a housing 201 in which a first mirror 202 is mounted. A second lower mirror portion 204 may optionally be mounted in housing 201, as is conventional in the art, so as to allow the driver to view scenes from a different angle and thereby reduce the driver's blind spots. Mirrors 202 and 204 may be movably mounted within housing 201 or, optionally, housing 201 may be movably mounted to one or more mounting brackets 206, which are adapted to mount the mirror assembly to the exterior of the truck cab in a conventional manner. At least one of mounting supports 206 defines a conduit through which a wire harness 208 may be run to provide electrical power and communication to any electrical components disposed within rearview mirror assembly 200. Such electrical components may include the inventive display 220 and also may include a motor for moving one or both of mirror portions 202 and 204, a heater disposed behind the mirror for heating the mirror and melting ice and snow from its surface during the winter, and any turn signal indicator or other lights disposed on mirror housing 201. Additionally, antennas are sometimes mounted to truck mirrors such that wire harness 208 may include an antenna lead line.

Figure 16:
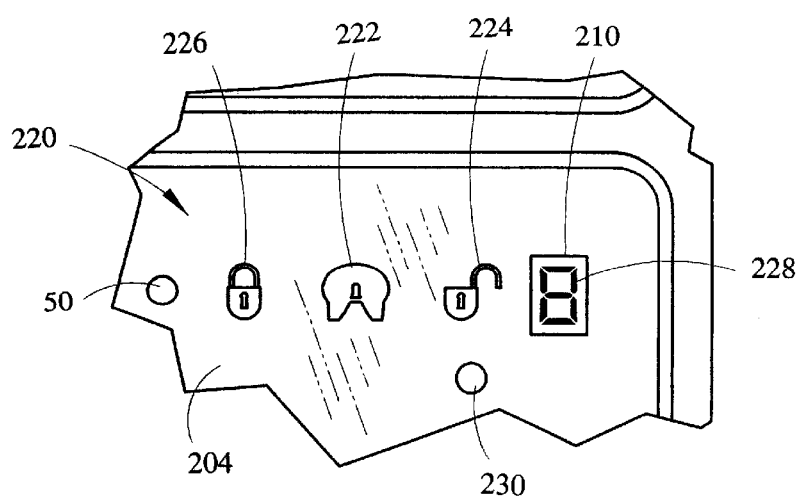
FIG. 16 is a close-up partial perspective view of the inventive display incorporated in the rearview mirror assembly shown in FIG. 15.

As shown in FIG. 15 and shown in more detail in FIG. 16, display 220 may be positioned behind one of mirror surfaces 202 or 204. To enable the display to be visible, the transparent window 210 is preferably formed in the reflective coating of one of mirror portions 202 or 204. Alternatively, in lieu of a window 210, the reflective coating on the mirror may be both partially reflective and partially transmissive to allow light from the display to be transmitted through the partially reflective and partially transmissive coating on the mirror. As yet another alternative, display 220 could be positioned on the housing 201 adjacent one of mirrors 202 and 204 or on one of the mirror bezels.

Display 220 may be of any form and display the requisite information in any format. FIG. 16 shows a preferred display 220. In general, display 220 is intended to display trailer coupling status information to the driver of the truck. Such information may include whether the truck hitch is in a ready-to-couple condition, whether the truck and its hitch are aligned with the trailer and its king pin, whether proper coupling has occurred, whether improper coupling has occurred, an error code identifying a potential reason why an improper coupling has occurred, and/or other information pertaining to the hitch such as the position of a sliding fifth wheel hitch and readings from a force sensing fifth wheel hitch such as that disclosed in commonly assigned U.S. patent application Ser. No. 09/457,900 filed Dec. 9, 1999, Applicant Jack L. Gisinger et al. entitled "FORCE-SENSING FIFTH WHEEL," the entire disclosure of which is incorporated herein by reference. In the preferred embodiment shown in FIG. 16, display 220 includes a fifth wheel-shaped icon 222, an open or unlocked padlock icon 224, a closed or locked padlock icon 226, and a seven-segment alphanumeric display 228. Alphanumeric display 228 may be used to display an error code, such as a number 0 through 9, which would enable the driver to refer to a reference book to determine the potential reason why a coupling attempt failed.

In the preferred embodiment, display 220 may further include an indicator light 230, which is a bright light directed towards the eyes of the driver. Indicator 230 is provided for the express purpose of attracting the driver's attention to the display when, for example, a properly coupled hitch suddenly becomes unhitched when the coupling system specifically determines that the uncoupling was a result of a failure or improper uncoupling attempt.

Display 220 may further include an indicator 50 corresponding to the indicator of the CAWS for indicating when the trailer is in alignment with the truck. Indicators 50 and 230 are shown as simply being circles. However, specific icons may be developed to aid in distinguishing one from another and from distinguishing the indicators from the other icons of the display. For example, indicator 50 could be represented as a target icon or the like to indicate alignment of the truck and trailer.

Preferably, display 220 includes a display panel having a black surface with masked or etched-out transparent portions in the shape of the icons, alphanumeric display window, or indicators. LEDs are then placed behind the icons and indicator windows to selectively illuminate the icons and indicators. Preferably, a red LED is provided behind the "unlocked" icon 224; either a yellow, red, and green tri-color LED or a bi-color LED is provided behind the "fifth wheel" icon 222; and a green LED is provided behind the "lock" icon 55. One of ordinary skill in the art will appreciate that the individual LEDs could be replaced with an LED array capable of providing multiple colors. The LEDs provided behind the openings for indicators 50 and 230 may be any suitable color. Alphanumeric display 228 may have any form, and is preferably a seven-segment LED display. Although an alphanumeric display 228 is shown that displays only a single alphanumeric character at a time, display 228 may be configured to display many characters at once and could be used to display messages in lieu of the icons that are otherwise provided.

As described in U.S. patent application Ser. No. 09/493,534, the icons may be illuminated as follows. When the truck is uncoupled from the trailer and the truck is put in reverse, the CAWS may be activated at which point indicator 50 is illuminated, provided the truck is in alignment with the trailer. At the same time, fifth wheel icon 222 may be illuminated with the yellow light from the tri-color LED to indicate that the fifth wheel is in a ready-to-couple condition. Alternatively, if a bi-color red/green LED is utilized behind icon 222, icon 222 may be green to indicate a ready-to-couple condition. Next, if a tilt sensor is present for sensing the tilting of the fifth wheel plate from its resting condition, icon 222 may change from a yellow to green color. This may otherwise occur when the king pin is sensed in the throat of the fifth wheel hitch plate. Then, when the lock sensor senses that the locking mechanism has properly locked the king pin in place, the "locked" icon 226 is illuminated with its green LED along with a green fifth wheel icon 222 to indicate to the driver that proper coupling has occurred. At any of these stages during the coupling process, indicator 50 for the CAWS may be turned off to avoid further distraction.

In the event that proper coupling does not occur, fifth wheel icon 222 may be illuminated with red light while "unlocked" icon 224 may also be illuminated with red light to clearly display to the driver that improper coupling has occurred. Indicator 230 may be activated at this time to ensure the driver is watching the display 220. An error code may then be displayed on alpha-numeric display 228 to indicate a potential reason for the failed coupling attempt. A fifth wheel hitch coupling control system, which senses these conditions and analyzes the sequence and timing of the hitching events to control a similar display, is disclosed in U.S. patent application Ser. No. 09/1493,534, the entire disclosure of which is incorporated herein by reference.

It will be appreciated by those skilled in the art that the circuitry for driving display 220 is provided in rearview mirror housing 201. The display driver may be coupled via wiring harness 208 to the associated processing circuits for the CAWS and/or the fifth wheel coupling control system. It is also possible to combine the processing circuits for the CAWS and fifth wheel coupling control systems. In this arrangement, the processing circuit(s) would be mounted within the truck remote from rearview mirror assembly 200. It is also possible that such circuitry could be mounted within rearview mirror assembly housing 201 with appropriate couplings to the system sensors and to the laser of the CAWS via wiring harness 208. Alternatively, some of the processing may be split such that preprocessing of the signals from the sensors may be performed remote from rearview mirror assembly 200 while some of the decision, post-processing, and display control may be performed by a processor located in mirror housing 201.

Display 220 should provide sufficient brightness to allow the driver to view the display during bright conditions, but should not be so bright as to overwhelm the driver during nighttime conditions. Preferably, display 220 and any other circuitry for the associated systems are provided on a circuit board that is potted within the mirror housing so as to protect the circuit and display from vibration, extreme temperatures, and moisture. It may also be desirable to shield the circuitry with an electrically conductive subhousing so as to not cause interference with any CB radio antenna or other radio antenna that is mounted to the mirror assembly. If the rearview mirror assembly incorporates a mirror heater, it may be desirable to modify the heating lines of the heater to extend around the display area. Preferably, the heater would at least heat the periphery of the display area to ensure that the display is cleared of ice and snow.

While the display shown in FIGS. 15 and 16 includes display elements for both a CAWS and a fifth wheel coupling system, it will be appreciated by those skilled in the art that the inventive rearview mirror assembly could include indicators for only one such system. Further, any additional information from any other systems or any additional information from the above-described systems may be displayed on display 220. For example, the estimated distance to the trailer may be displayed on an alpha-numeric display or otherwise indicated by a series of LED devices or LED segments to represent the proximity of the truck to the trailer. Further, an indication of how close the truck is to being in alignment with the trailer may also be provided. Such an indication may show in which direction the truck is out of alignment (i.e., to the left, to the right, too high, or too low).

The entire system may draw its operating power from the truck's power supply, typically a twelve-volt battery. In addition, although the indicator is preferably mounted to the exterior mirror of the truck, it may also be mounted within the cab or any convenient place in which it may be monitored by the operator of the vehicle.

Other applications of the alignment system of the instant invention have also been contemplated. For instance, employers in the heavy trucking industry could use the system as a training device for beginning drivers and to provide guidance to drivers who otherwise would be merely "eyeballing" the coupling operation, often a difficult task even for experienced drivers. By training new drivers with the help of the instant invention, employers will minimize the chance that the new drivers will damage their equipment, thus significantly reducing the overall cost of training. Also, by utilizing the data storage capabilities of the processor, the system could be used as a type of "black box" in the event that an accident does occur, i.e., employers will be able to determine whether their drivers heeded the signals of the CAWS and coupling control systems. For instance, the CAWS could be used in conjunction with the coupling control system of the above-referenced '534 application to record additional feedback information as the driver attempts to achieve positive coupling. The proximity sensing capabilities of the '534 application could be utilized to signal the microprocessor 46 to begin recording position data within a predetermined range, preferably near coupling. By analyzing the recorded data, users will be able to determine whether the driver maneuvered the towing unit in response to a CAWS signal that indicated that the towing unit was aligned with the towed unit.

Further, the present invention could be used to align the back of a trailer with a loading dock, and the CAWS could be used in various other transportation alignment applications. For example, the retro-reflective target could be mounted in a boat docking station, with the primary system components mounted on the boat, for assisting the driver with parking the boat.

Unlike previous systems, the system of the instant invention may be retrofit to any vehicle/trailer combination and, because a minimum number of components is necessary, the overall cost of manufacture is relatively low.

The above description is considered that of the preferred embodiment only. Modifications of the invention will occur to those skilled in the art and to those who make or use the invention. Therefore, it is understood that the embodiment shown in the drawings and described above are merely for illustrative purposes and not intended to limit the scope of the invention, which is defined by the following claims as interpreted according to the principles of patent law, including the doctrine of equivalents.

The invention claimed is:

1. A rearview mirror assembly for a truck having a coupling status system for sensing trailer coupling status, said rearview mirror assembly comprising:
   a mirror housing adapted for mounting to a truck;
   a mirror disposed within said mirror housing; and
   a display carried by said housing, said display is coupled to the coupling status system for displaying trailer coupling status information to a driver of the truck.

2. The rearview mirror assembly of claim 1, wherein said mirror housing is configured for mounting to the outside of the truck.

3. The rearview mirror assembly of claim 1, wherein said display is mounted in said mirror housing behind said mirror, wherein said mirror includes a region that is at least partially transparent for light from the display to transmit through said region so as to be visible to the driver.

4. The rearview mirror assembly of claim 1, wherein said display includes an icon that is illuminated when the system indicates that the truck hitch is in a ready to couple condition.

5. The rearview mirror assembly of claim 1, wherein said display includes alphanumeric display for displaying an error code pertaining to a failed coupling attempt.

6. The rearview mirror assembly of claim 1, wherein said display includes an icon that is illuminated when the trailer is not properly locked to the truck.

7. The rearview mirror assembly of claim 1, wherein said display includes an icon that is illuminated when the trailer is properly locked to the truck.

8. The rearview mirror assembly of claim 1, wherein said display includes at least one indicator light indicating the alignment of the trailer to the truck prior to coupling.

9. The rearview mirror assembly of claim 1, wherein said display includes a bright light aimed towards the driver to attract the driver's attention to said display.

10. A fifth wheel hitch coupling status sensing system for a truck equipped a fifth wheel hitch and at least one sensor for sensing whether a trailer kingpin is properly locked into the fifth wheel hitch, said system comprising:
   a rearview mirror assembly including a mirror housing, a mirror mounted in said mirror housing, and a support structure adapted for attachment to the exterior of the truck;
   a display carried on said mirror housing; and
   a control circuit disposed in said mirror housing and coupled to said display for receiving signals from said at least one sensor and for controlling said display in response to the signals from said at least one sensor to display coupling status information to a driver of the truck.

11. The fifth wheel hitch coupling status sensing system of claim 10, wherein said display is mounted in said mirror housing behind said mirror, wherein said mirror includes a region that is at least partially transparent for light from the display to transmit through said region so as to be visible to the driver.

12. The fifth wheel hitch coupling status sensing system of claim 10, wherein said mirror housing is configured for mounting to the outside of the truck.

13. The fifth wheel hitch coupling status sensing system of claim 10, wherein said display includes an icon that is illuminated when the system indicates that the truck hitch is in a ready to couple condition.

14. The fifth wheel hitch coupling status sensing system of claim 10, wherein said display includes alphanumeric display for displaying an error code pertaining to a failed coupling attempt.

15. The fifth wheel hitch coupling status sensing system of claim 10, wherein said display includes an icon that is illuminated when the trailer is not properly locked to the truck.

16. The fifth wheel hitch coupling status sensing system of claim 10, wherein said display includes an icon that is illuminated when the trailer is properly locked to the truck.

17. The fifth wheel hitch coupling status sensing system of claim 10, wherein said display includes at least one indicator light indicating the alignment of the trailer to the truck prior to coupling.

18. The fifth wheel hitch coupling status sensing system of claim 10, wherein said display includes a bright light aimed towards the driver to attract the driver's attention to said display.

19. An alignment warning system for coupling a towed unit to a towing unit comprising:
   a light source for emitting a beam of light, said light source being attached to the towing unit;
   at least one sensor attached to the towing unit for receiving light and for generating a detection signal;
   a control circuit that receives the detection signal and generates an indicator signal in response to the detection signal; and
   a display mounted in a rearview mirror assembly and responsive to said indicator signal for displaying whether the towing unit is aligned with the towed unit.

20. The alignment warning system of claim 19, wherein said display is mounted in an outside rearview mirror assembly.

* * * * *